United States Patent
Asai et al.

(10) Patent No.: US 6,710,785 B1
(45) Date of Patent: Mar. 23, 2004

(54) DIGITAL VIDEO EDITING METHOD AND SYSTEM

(75) Inventors: Kayoko Asai, Tokyo (JP); Hiroaki Yoshio, Tokyo (JP); Hitoshi Kato, Tokyo (JP); Tomomi Kaga, Kawasaki (JP)

(73) Assignee: Matsushita Electric Industrial, Co. Ltd., Osaka (JP)

( * ) Notice: Subject to any disclaimer, the term of this patent is extended or adjusted under 35 U.S.C. 154(b) by 0 days.

(21) Appl. No.: 09/184,584

(22) Filed: Nov. 3, 1998

(30) Foreign Application Priority Data

Nov. 4, 1997 (JP) ............................................. 9-316638

(51) Int. Cl.$^7$ ................................................. G06F 3/00
(52) U.S. Cl. ...................... 345/723; 345/719; 345/765; 345/810
(58) Field of Search ................................ 345/716, 719, 345/720, 721, 723, 724, 725, 726, 765, 781, 810, 835, 846; 386/46, 52, 53, 75; 715/500.1, 501.1

(56) References Cited

U.S. PATENT DOCUMENTS

| | | | |
|---|---|---|---|
| 5,237,648 A | | 8/1993 | Mills et al. .................. 345/723 |
| 5,339,393 A | | 8/1994 | Duffy et al. ................. 345/723 |
| 5,359,712 A | * | 10/1994 | Cohen et al. ................ 345/723 |
| 5,404,316 A | * | 4/1995 | Klingler et al. ............. 345/723 |
| 5,537,530 A | | 7/1996 | Edgar et al. |
| 5,732,184 A | * | 3/1998 | Chao et al. ................... 386/55 |
| 5,966,121 A | * | 10/1999 | Hubbell et al. ............. 345/726 |
| 6,154,601 A | * | 11/2000 | Yaegashi et al. ............. 386/52 |
| 6,262,777 B1 | * | 7/2001 | Brewer et al. .............. 348/515 |
| 6,532,043 B1 | * | 3/2003 | Kurtze et al. ............... 348/584 |

FOREIGN PATENT DOCUMENTS

| | | |
|---|---|---|
| EP | 0 737 978 | 10/1996 |
| EP | 0 801 390 | 10/1997 |
| EP | 0 863 510 | 9/1998 |
| WO | WO 97 39452 | 10/1997 |

OTHER PUBLICATIONS

Yoshinoby Tonomura et al, "Content Oriented Visual Interface Using Video Icons for Visual Database Systems", 1989, IEEE pp. 68–73.*

Jacopo M. Corridoni et al, "Structured Digital Video Indexing", 1996, IEEE, pp. 125–129.*

Kamlesh Talreja et al, "Editing Techniques for MPEG Multiplexed Streams", 1997, IEEE, pp. 278–285.*

Kazuaki Tanaka et al.:"Kantan Video Image Retrieval User Interface" Hitachi Review, Hitachi Ltd. Tokyo, JP, vol. 45, No. 2, Apr. 1, 1996 pp. 95–100, XP000622841 ISSN: 0018–277X.

* cited by examiner

Primary Examiner—John Cabeca
Assistant Examiner—X. L. Bautista
(74) Attorney, Agent, or Firm—Lowe Hauptman Gilman & Berner, LLP

(57) ABSTRACT

A video editing system has the functions of: a) scene browsing with next and back icons and/or a scroll bar; b) recursive scene segmentation available with the browsing function; c) scene/clip specification with a reversing option (in case of a system with two display areas); d) recursive scene grouping; d) scene clipping based on selection by default; e) clip sorting in order of time or in a specified order; f) relative position restoration of a specified scene (in case of a system with a single display area); g) clamping a scene to its original play time; and h) scene transition processing.

54 Claims, 18 Drawing Sheets

FIG. 4
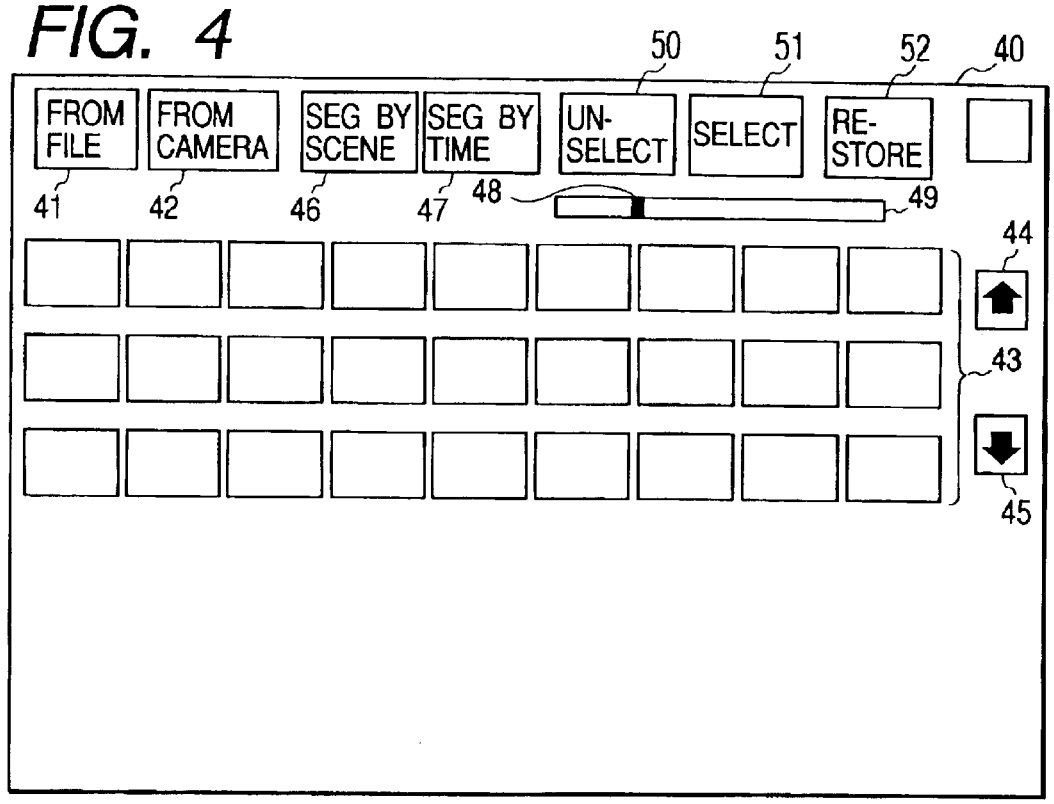
FIG. 5
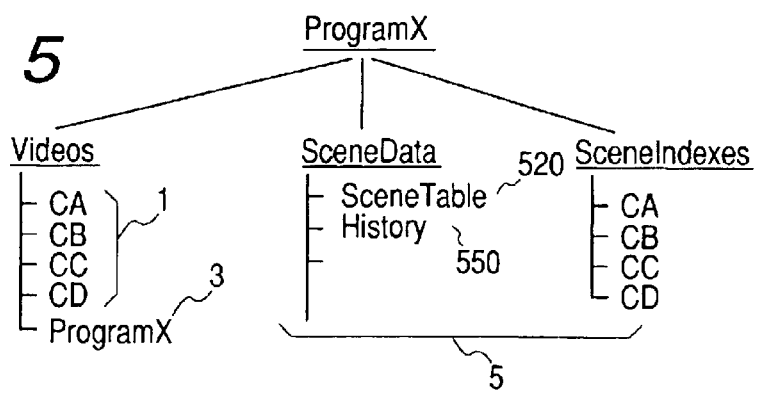
FIG. 6
| SCENE ID | BEGIN FRAME | END FRAME | LENGTH (FRAMES) | LENGTH (TIME) | SE-LECT | ORG ORDER | ... |
|---|---|---|---|---|---|---|---|
| CA | | | 132300 | 73.30" | Y | | ... |
| CB | | | 2700 | 1.30" | Y | | ... |
| CC | | | 1800 | 1.00" | Y | | ... |
| CD | | | 2700 | 1.30" | Y | | ... |

FIG. 7

| SCENE ID | BEGIN FRAME | END FRAME | LENGTH (FRAMES) | LENGTH (TIME) | SE- LECT | ORG ORDER | ... |
|---|---|---|---|---|---|---|---|
| CB | 1 | 2700 | 2700 | 1.30" | Y | 7 | ... |
| CC | 1 | 1800 | 1800 | 1.00" | Y | 8 | ... |
| CD | 1 | 2700 | 2700 | 1.30" | Y | 9 | ... |
| CA.1 | 1 | 8995 | 8995 | 5.00" | Y | 1 | ... |
| C1.2 | 8996 | 26550 | 17555 | 9.46" | Y | 2 | ... |
| ⋮ | ⋮ | ⋮ | ⋮ | ⋮ | ⋮ | ⋮ | ⋮ |
| CA.6 | 100800 | 132300 | 31500 | 17.30" | Y | 6 | ... |

FIG. 8

| CA.1 | CA.2 | CA.3 | CA.4 | CA.5 | CA.6 | CB | CC | CD | ... |
|---|---|---|---|---|---|---|---|---|---|

FIG. 9

| ... | FRAME POINTER | COMPO- NENTS | SELECTED ORDER | CLAMP | TRANSI EFFECT | ... |
|---|---|---|---|---|---|---|
| | 524 | 526 | 528 | 530 | 532 | |

MULTIPLE FRAME DISPLAY

SINGLE FRAME DISPLAY

| CURRENT STATE | CB | CA.2 | CA.1 | CA.3 | CA.4 | CA.5 | CC | CD | CE |
|---|---|---|---|---|---|---|---|---|---|
| SPE.1 |  | 2 |  |  |  |  | 1 |  |  |
| CASE 1(1) | CB | CA.2 · CA.1 · CA.3 · CC | | | CA.4 | CA.5 | | CD | CE |
| CASE 2(2) | CB | CA.4 | CA.5 | CC · CA.2 · CA.1 · CA.3 | | | | CD | CE |
| CASE 4 | CB | CA.1 · CA.2 · CA.3 · CC | | | CA.4 | CA.5 | | CD | CE |
| SPE.2 |  | 2 | 3 |  |  | 1 |  |  |  |
| CASE 1(2) | CB | CA.2 · CA.1 · CA.5 | | CA.3 | CA.4 | | CC | CD | CE |
| CASE 2(2) | CB | CA.3 | CA.4 | CA.5 · CA.2 · CA.1 | | | CC | CD | CE |
| CASE 3 | CB | CA.1 · CA.2 · CA.5 | | CA.3 | CA.4 | | CC | CD | CE |

SELECTION
(IN SCENE DISPLAY AREA 43)

FIG. 26

UNSELECTION
(IN CLIP DISPLAY AREA 53)

```
        START              330

WRITE "N" IN THE SELECT FIELD OF EACH      332
OF THE SPECIFIED CLIPS

FOR EACH OF THE SPECIFIED CLIPS, DECREMENT  334
THE VALUE OF THE SELECTED ORDER FIELDS 528
WHOSE VALUES ARE LARGER THAN THAT OF THE
SPECIFIED CLIPS; AND WRITE 0 IN THE SELECTED
ORDER FIELDS 528 OF THE SPECIFIED CLIPS

MOVE THE SELECTED CLIP INDEXES FROM CLIP    336
DISPLAY AREA 53 TO SCENE DISPLAY AREA 43

RETURN
```

FIG. 27

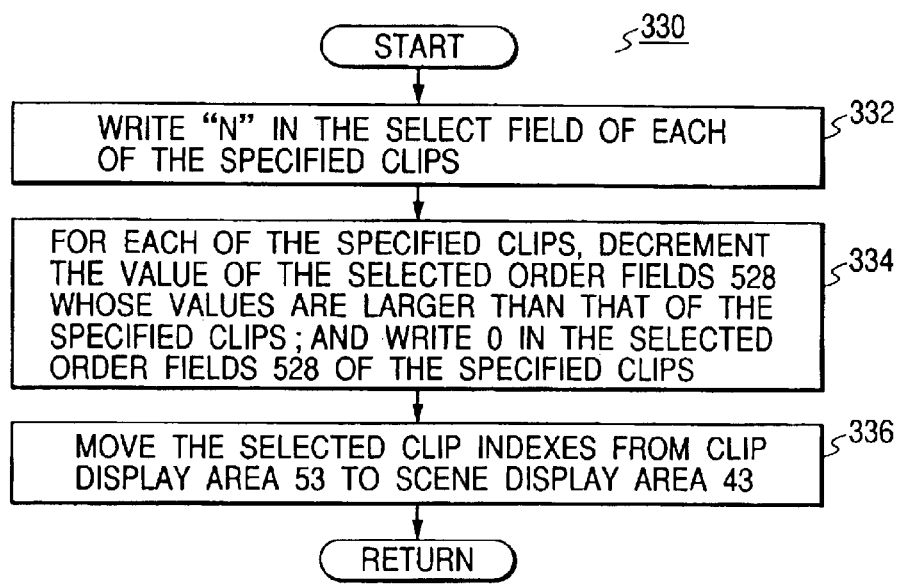

DIGITAL VIDEO EDITING METHOD AND SYSTEM

BACKGROUND OF THE INVENTION

1. Field of the Invention

The invention generally relates to a digital video editing method and system and, more particularly, to a method and system for assembling an edited program from one or more digital video source material taken in from a video camera, storage media and/or transmission media by selecting and ordering segments (or scenes) of the video source materials.

2. Description of the Prior Art

U.S. Pat. No. 5,537,530 issued Jul. 16, 1996 discloses a typical method for editing video comprised of a sequence of video segments by locating segment boundaries and reordering segment sequences. Frames associated with sequences of video source material representing a series of scene changes are digitized. The digitized information is analyzed to identify one or more frames of the source material associated with and representative of each such scene change and/or sequence. The representative frames are displayed. A selected frame from the display will thereby cause automatic selection and association of a sequence of frames. The corresponding frames of video segments or scenes corresponding to each such selected and ordered representative frame are thereby automatically also ordered. Simplified video editing is accomplished by manipulating these representative frames, each associated with a different scene or video sequence.

U.S. Pat. No. 5,237,648 issued Aug. 17, 1993 discloses "Apparatus and method for editing a video recording by selecting and displaying video clips." In the editing system, the user is presented with a video window for displaying the video information, a control window for regulating playback of the video information, and a clip list window having a number of rows of edit windows organized under begin, end, and clip columns. The user can generate video clips and change the clips by clicking on the desired video frame to generate a small digitized version of the frame and moving the small digitized frame from the video window to an edit window.

U.S. Pat. No. 5,218,672 issued Jun. 8, 1993 discloses a post production off-line editing system for storing unedited video takes in a random access memory (a set of laser video disk players), displaying selected takes (or individual frames from selected takes) and generating an edit list which defines an edited video program. The user can include, in the edit list, definitions of various video transitions between scenes, such as dissolves, fades, and wipes.

However, prior art video editing systems provide only an editing method based on either selection or elimination of a specified video scene. In some cases, it will be desirable to specify and select a necessary portion, and in other cases, it may be desirable to specify and eliminate an unnecessary portion. It is therefore an object of the invention to provide a video editing system which permit the user to issue a desired one of selection and deletion commands for a specified object.

The above and other prior art video editing systems usually have a so-called undo function. Issuing some undo commands at a certain editing state causes the current editing state to be restored to the previous editing state by each of the issued undo commands. However, it may be sometimes desired to restore a specific scene to its last relative position in order with respective to the scene which was just before or after the specific scene in order before the specific scene has taken the current position. Therefore, it is another object of the invention to provide a video editing system having a restore function of restoring a specified scene to its last relative position in order with respective to the scene which was just before or after the specific scene in order before the specific scene has taken the current position.

In the above and other prior art video editing systems, a series of frames or a scene is dealt with as an editing unit (or a clip). However, there are sometimes two or more scenes that the user desires to manipulate as a single clip though the scenes are discontinuous in time or derived from different source videos. Therefore, it is further object of the invention to provide a video editing system which not only permits the user to group two or more scenes together to make the grouped scenes a clip but also provides various improved and novel functions such as enhance the user's convenience and the efficiency of video editing.

SUMMARY OF THE INVENTION

According to the invention, a video editing system comprises a computer system provided with a mass storage and further provided or connected with one or more video source such as an optical disc player, video cassette recorder (VCR) and/or camera The computer system operates under the control of standard operating software and video editing software stored in the mass storage.

In preparation for a subsequent editing process, one or more source videos are first collected and stored as video source material in the mass storage. One or more of the stored source videos is (or are each) checked to generate scene records which define respective video segments constituting the source video(s). Scene records are also generated for the other source videos. Thereafter, the video segments and the other source videos are called "scenes" and dealt with by operating respective scene records.

The display screen of the system has at least one scene display area. The area is comprised of an array of windows for each displaying a frame representative of each of available scenes constituting the source videos (the frame is hereinafter referred to as "a scene index"). The scenes are displayed in the area even if they are selected as clips for use in the video program.

In a preferred embodiment, the records are maintained as a scene table. Each record has at least the field of an ID and the length-in-number. Each record preferably contains begin and end frame numbers, a selection flag, a frame pointer for scene scrolling, a component scene IDs for grouping capability, a selected order for clip sorting in selected order, a clamp flag for scene clamping, and a transitional effect.

Simulation is conducted through manipulations of scene and clip indexes, e.g., segmentation, grouping, clipping, ordering, etc. Information on a series of such manipulations is accumulated in the scene table. Finally, a clip list is obtained. According to the clip list, an edited video program is compiled.

According to the principles of the invention, one or more frame of a user-specified scene or clip is displayed. Any frame of the scene is accessible by controlling forward and backward button and a scrolling bar. The value of a frame pointer is stored for each index, enabling a resume of viewing.

Specifying desired scenes or clips, the user can group the desired scenes or clips. In grouping, a scene record is added to the scene table. IDs of grouped scenes or clips are stored in a component field of the added record. An index for the group is added to an index set. The indexes for the specified indexes are deleted from the index set. The grouping is achieved either in order of time if the specified scenes or clips have been derived a single source video or in a specified order. Grouped scenes or clips are further grouped.

In an embodiment with two display areas for scenes and clips, once scenes are grouped, the grouped scene becomes a clip automatically. That is, the grouped scenes disappear from the scene display area, instead appear in a clip display area.

Also, in an embodiment with scene and clip display areas, a flexible index specifying function is provided. If the user specifies desired ones of the indexes, the desired ones are become in a specified state and the remaining indexes become in a nonspecified state. If the user enters a predetermined input at this point of time, the specified state and the nonspecified state are reversed.

Selection and unselection functions cause a scene and a clip to be changed to a clip and a scene, respectively. This functions can be applied to the same scene or clip at any times. Each time one of the two functions, predetermined fields (selected order fields in an illustrative embodiment) of the record are so updated that the selected order fields retain values indicative of the order of selection of respective scenes and clips. By doing this, the clips can be sorted in the selected order.

The clips can be sorted in order of time if the clips are derived from a single source video.

Each time a segmentation or a grouping is performed, predetermined fields (original order fields in an illustrative embodiment) of the records which each contain the order of the scenes are so updated that the fields of the records reflect the order of current scene indexes. If the user issues a predetermined command while specifying a desired scene index, then the specified scene index is restored to a relative position with respect to a scene index which the specified scene index was adjoining at a time of occurrence of a predetermined event. In a preferred embodiment, the event is a later one of a last segmenting and a last grouping. The user can select whether the specified scene index should be restored to a next-based relative position or a back-based relative position.

The video editing system is further provided with a function for causing a start time, in the edited video, of a user-specified one of the video segments (derived from a single source video) to be the same as that in the single source video (hereinafter referred to as "clamping the user-specified video segment to the single source video"). For this purpose, the user can issue a command to clamp a specified video, causing a flag to be set in a predetermined field of a record associated with the specified video. Then, in a compiling process, a scene just preceding the specified video is so trimmed that an end frame number of the preceding scene in a program being compiled is smaller by one than a value of a begin frame field of the record associated with the specified video.

Also, the user can set one of predetermined transitional video effects to an effect-containing field of a record associated with a user-specified index. Then, an effect identified by the effect-containing field is applied to the video segment associated with the user-specified index.

BRIEF DESCRIPTION OF THE DRAWING

Further objects and advantages of the present invention will be apparent from the following description of the preferred embodiments of the invention as illustrated in the accompanying drawing, in which:

FIG. 4 shows an example of the edit display screen;

FIG. 5 is a diagram showing how various data are stored in the mass storage 112;

FIG. 6 is a diagram showing an example of a scene table just after the creation thereof;

FIG. 7 is a diagram showing an example of the scene table 520 after a source video, e.g., CA has been segmented;

FIG. 8 is a diagram showing an exemplary arrangement of the scene indexes displayed in the scene display area 43 after the automatic logical segmentation of the scene CA;

FIG. 9 is a diagram showing the structure of a part of the scene table 520 which part follows the ORG ORDER field 522;

FIGS. 25 and 26 are flowcharts showing exemplary operations of a selection subroutine 320 and a unselection subroutine 330 according to the principles of the invention;

FIG. 27 is a diagram showing an example of a scene selection in which a selection command is executed after reversing the specified/unspecified state of the scenes.

Throughout the drawing, the same elements when shown in more than one figure are designated by the same reference numerals.

DETAILED DESCRIPTION OF THE PREFERRED EMBODIMENTS

Figure 1:
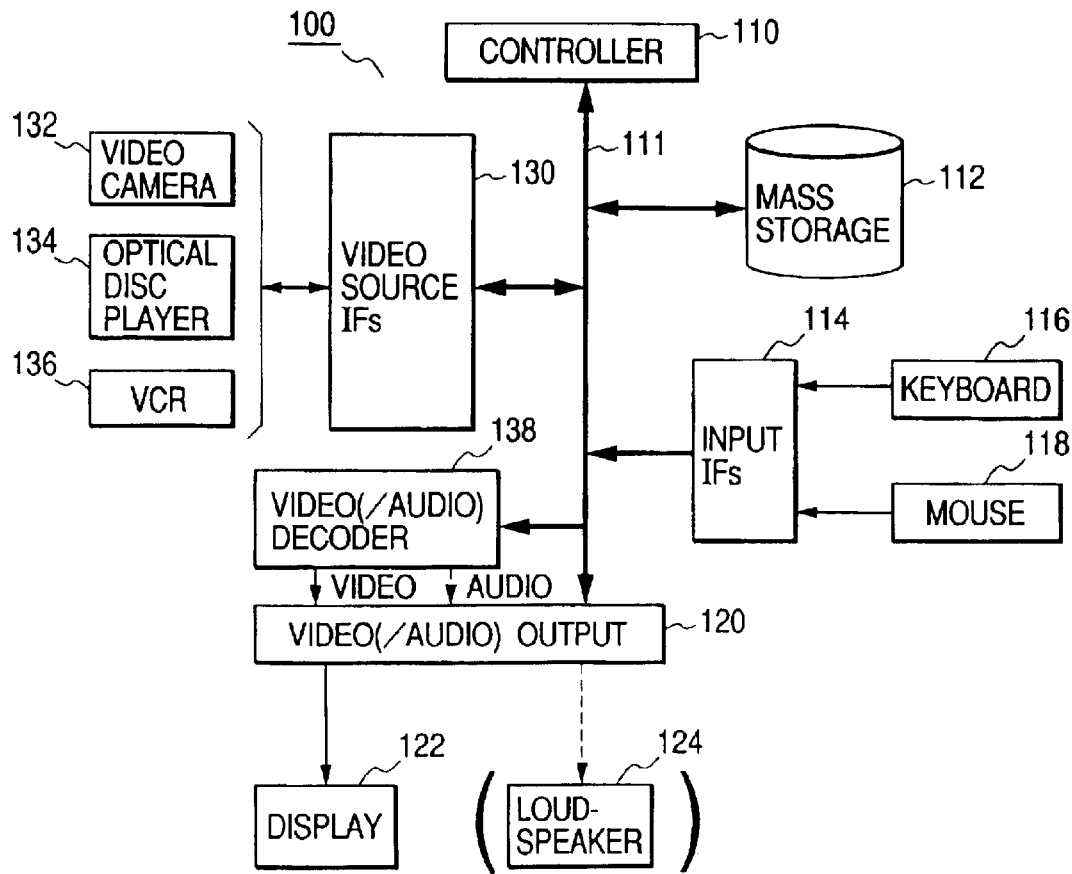
FIG. 1 is a schematic block diagram showing an arrangement of a video editing system embodying the principles of the invention.

FIG. 1 is a schematic block diagram showing an arrangement of a digital video editing system 100 embodying the principles of the invention. In FIG. 1, the video editing system 100 is a computer-based system which comprises a controller 100 including a central processing unit (not shown), a read only memory (not shown) and a random access memory (not shown) which are interconnected through a system bus 111; a mass storage device 112; a keyboard 116 and a mouse 118 connected through input interfaces (ifs) 114, and a display 122 connected through a video interface 120. The system 100 may further comprise a loudspeaker 124, in which case the element 120 will comprise a video and audio interfaces. The video editing system 100 includes one or more video source device such as a video camera lautomatic, an optical disc player 134, a video cassette recorder (VCR) 136, etc. which is (or are) connected to the system bus 111 through respective video source interfaces 130. The system 100 further includes a video (and audio) decoder 138 for converting a coded video and audio data stream into a digital video stream (and a digital audio stream) which is (or are) supplied to the video (and audio) output interface(s) 120.

The video(/audio) decoder 138 may be any suitable one such as a standard MPEG decoder. The video (and audio) output Ifs 120 preferably includes a video (and audio) digital/analog converter (not shown) and an NTSC (National Television Standard Committee) or PAL (Phase Alternation by Line) encoder (not shown) for example.

Figure 2:
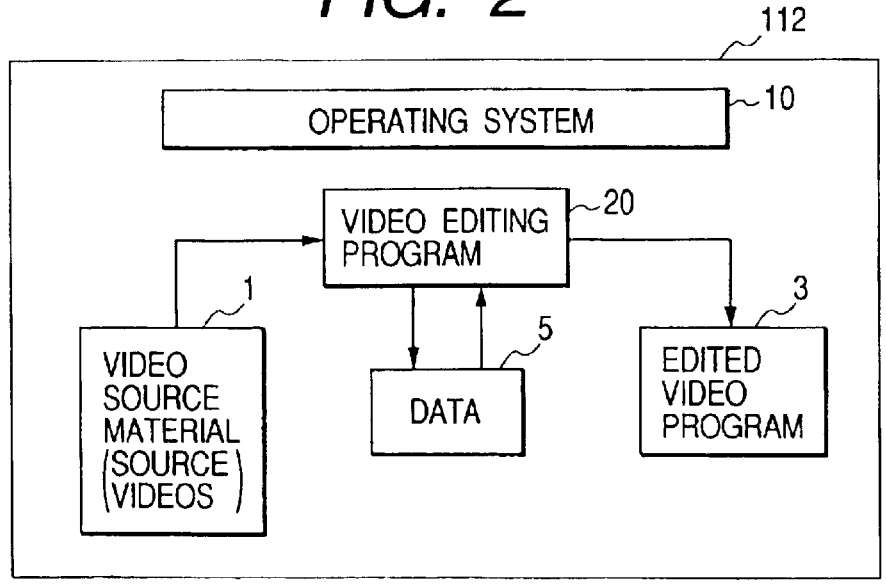
FIG. 2 is a diagram illustrating contents of the mass storage device 112 of FIG. 1.

FIG. 2 is a diagram illustrating contents of the mass storage device 112. The mass storage device 112 at least stores an operating system 10, a video editing program 20, video source material 1 (comprised of source videos) to be edited, an edited video program 3 edited by the video editing program 20, and various data 5 which are created and used by the video editing program 20 in the course of an editing process. The operating system 10 may be any suitable standard or tailored operating system.

Embodiment I

Figure 3:
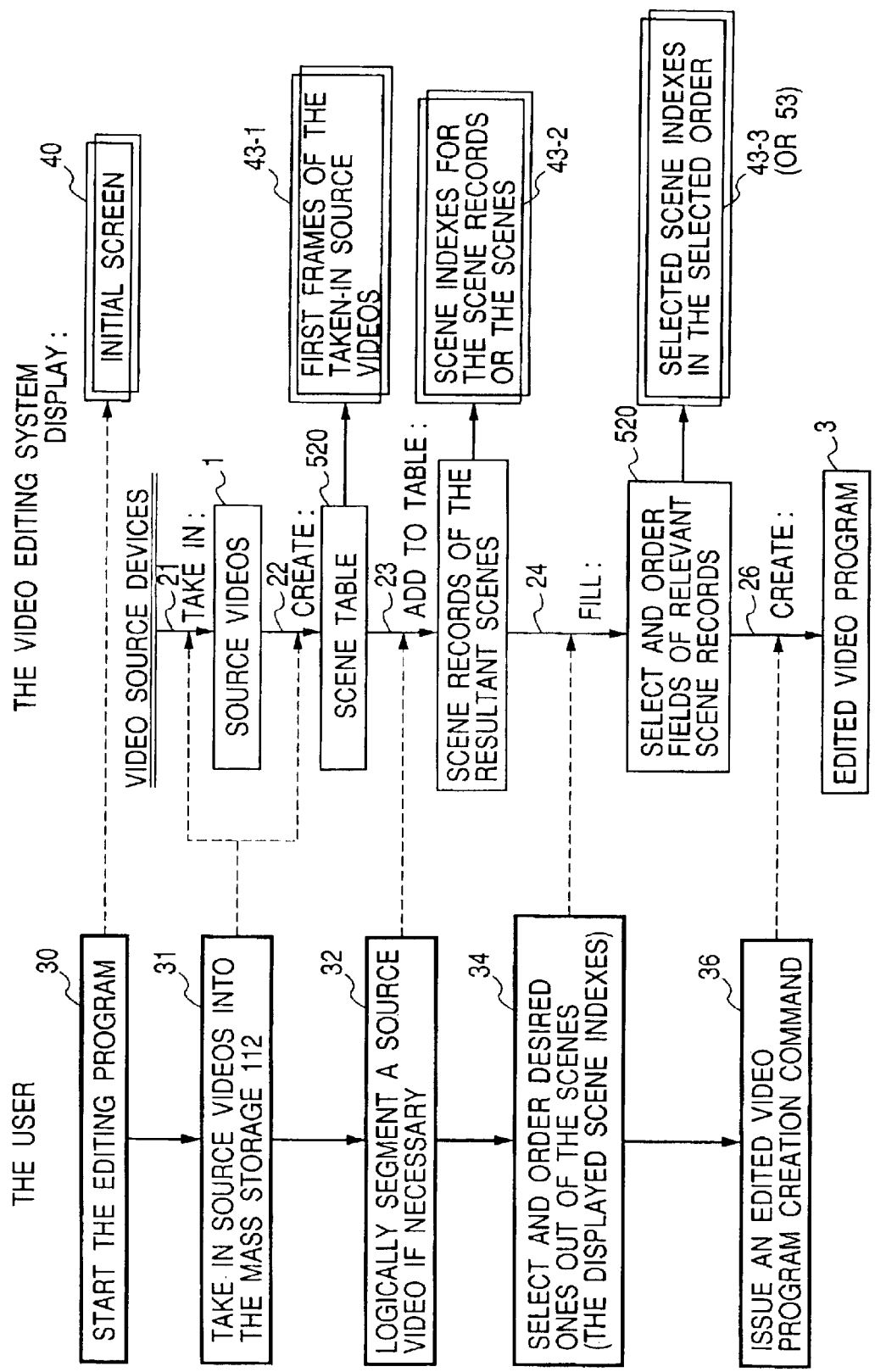
FIG. 3 is a schematic diagram illustrating exemplary operations of the user and the controller 110 (or a not-shown CPU) of the video editing system 100 under the control of the video editing program 20 in accordance with a first illustrative embodiment of the invention.

FIG. 3 is a schematic diagram illustrating exemplary operations of the user and the controller 110 or the CPU (not shown) of the video editing system 100 under the control of the video-editing program 20 in accordance with a first illustrative embodiment of the invention. In FIG. 3, bold-line boxes denote operations by the user, fine-line boxes denote data, and double-line boxes denote displayed contents.

The user first starts the video-editing program 20 in step 30. Then, the CPU (or the controller 100) displays an edit display screen 40. FIG. 4 shows an example of the edit display screen 40. In FIG. 4, the edit screen 40 includes camera and file buttons 41 and 42 for taking in a source video from a camera 132 and files stored in a storage media (134 or 136), respectively. The edit screen 40 further includes a scene display area 43 comprising an array of small frame windows in each of which a frame is displayed, and scroll-up and scroll-down buttons 44 and 45 for scrolling the displayed frame lines up and down, respectively.

The user first takes in at least one source videos 1 by using the camera 41 and file 42 buttons in step 31. The CPU responsively takes in the source videos 1 in a predetermined directory or folder of the mass storage 112 as shown in FIG. 5 in step 21. Then, the CPU creates a scene table 520 (shown in FIG. 6) and enters records of the taken-in source videos 1 in the scene table 520 in step 22. Further, the CPU stores a file containing each of the first frames of the source videos 1 in a predetermined directory in the mass storage 112 and displays the first frames in the scene display area 43. It is noted that the source videos 1 may comprise, for example, one content video and a plurality of commercial videos, or may comprises, for example, a plurality of content videos and a plurality of commercial videos.

FIG. 5 is a diagram showing how various data are stored in the mass storage 112, wherein directories are shown by underlining respective directory names. A directory is created in the name of a desired video program, say, "ProgramX" (in this example) in the mass storage 112. The data directory "ProgramX" comprises the directories "Videos," "SceneData" and "Scenelndexes" for example. The directory Videos contains the source videos (CA, CB, CC, CD in this example) 1 and is to contain an edited video program (ProgramX in this example) 3 when the editing process has completed. The directory SceneData contains the scene table as detailed below. The directory SceneIndexes contains scene indexes (detailed below) corresponding to the source videos 1, e.g., CA, CB, CC, CD. The scene indexes are preferably named identical to corresponding source videos in this example.

FIG. 6 is a diagram showing an example of a scene table just after the creation thereof. The scene table 520 maintains scene records of all the pieces of video data or the scenes available for assembling an edited video program: i.e., the taken-in source videos (CA, CB, CC, CD in this example) 1 and the video segments obtained from segmentation of any source videos as detailed later. A scene record of each scene includes: e.g. begin frame and end frame fields which, if the scene is a segment of any source video, contain the begin frame number and the end frame number of the segment in the original source video; a length-in-frame field which contains the number of frames constituting the scene; a length-in-time field which contains the play time, at the normal play speed, of the scene in the form of "M.S" where M and S denotes minutes and seconds of the time, respectively; a select field which contains a flag indicative of whether the scene has been selected for assembling a edited video program, e.g., "Y" (for "yes") or "N" (for "no"); and an original order (ORG ORDER) field 522 which contains the display order of the scene index displayed just after an automatic segmentation which order is used in a relative positive position restoration function detailed later.

Since FIG. 6 shows a scene table 520 just after the creation thereof and accordingly any of the source videos has not experienced a segmentation or an ordering, the scene records have no value in the begin and end frame fields, and the original order field 522. Specifically, the source video CA has values CA, 132300, 73.30" and Y in the frame ID, length (frames), and length (time) frames, respectively; the source video CB has values CB, 2700, 1.30" and Y in the respective frames; and so on. The values of the select fields are all Y's because in default of selection, the illustrative embodiment deals with the scenes as selected for use in the object video program.

Referring to FIG. 3, if there are any of the source videos 1 that need segmentation, the user applies an automatic logical segmentation to such source videos in step 32. Specifically, the user specifies a desired source video with a pointing device such as the mouse 118 and clicks on either a button 46 for logical segmentation by scene changes or a button 47 for logical segmentation by a certain time interval or frame number, which may be preset by the user. In response to a clicking on the button 46 or 47, the CPU logically segments the specified source video in a respective manner. That is, the CPU adds a scene record to the scene table 520 for each of the obtained video segments or obtained scenes identified by scene changes such as changes in the brightness and/or the color tone or by a time or frame interval through the scanning of the specified source video record in step 23. Then, the CPU deletes the scene record of the segmented source video from the scene table 520.

FIG. 7 shows an example of the scene table 520 after the automatic logical segmentation of a source video, e.g., CA. As seen from the table of FIG. 7, the scene record CA has been deleted, but six new records are instead added in the names CA.1 through CA.6. In this way, the scenes obtained from a segmentation of a source video are each named by simply appending a delimiter (e.g., "." in this example) and a serial number to the scene ID of the source video. Since the scenes CA.1 through CA.6 have been derived from a single scene CA, the scene records CA.1 through CA.6 have also respective values in the begin and end frame fields. It is noted that the begin and end frame fields for the raw videos CB, CC and CD are also filled for the sake of convenience.

On updating the scene table 520, the CPU deletes the scene index file CA from the SceneIndexes directory, and adds six scene index files which contain, for example, the first frames of the new scenes CA.1 through CA.6 to the scene table 520. Then, the CPU displays, in the scene display area 43, the frames or scene indexes (43-2 of FIG. 3) contained in the scene index files (CA.1 through CA.6, CB, CC and CD) in the SceneIndexes directory. In this case, the scene indexes are preferably displayed in order of the segmented scenes and the raw scenes as shown in FIG. 8. For this reason, the original order fields 522 of the scene records CA.1 through CA.6, CB, CC and CD contain the values 1 through 9, respectively.

It should be noted that if the scenes and respective scene indexes are stored in the same names in different directories as described above, the scene indexes can be managed in the above described manner. Otherwise, each record in the scene table 520 will need an additional field for containing the name of scene index file for the corresponding scene. It is also noted that the user is permitted to select any frame in a scene for the scene index, in which case the selected frame is stored in the scene index file.

Referring to FIG. 3, the user selects desired scenes out of the available scenes by specifying desired ones of the scene indexes 43-2 displayed in the scene display area 43, where the selected scenes are thereafter referred to as "clips," and arranges the order of the selected scenes or clips in step 34. Responsively, the CPU fills the select and order 522 fields of the scene records in the scene table 520 as detailed later in step 24 and displays the representative frames or indexes of the clips and the other scenes such that the clip indexes and the scene indexes are in normal and reduced contrast, respectively, and the clip indexes are sorted in the arranged order.

If the user finally issues an edited video program creating command in step 36, then the CPU assembles an edited video program based on the records of the clips in the scene table 520 in step 26.

The video editing system 100 according to the first illustrative embodiment of the invention is provided with the capabilities of:

a) scene browsing with next and back icons and/or a scroll bar;

b) recursive scene segmentation available with the browsing function;

c) recursive scene grouping;

d) scene clipping based on selection by default;

e) clip sorting;

f) relative position restoration of a specified scene;

g) clamping a scene to its original play time; and h) scene transition processing.

These features of the video editing system 100 will be described referring to FIG. 9.

Browsing and Segmentation

A frame pointer field 524 of the scene table 520 of FIG. 9 contains a pointer for use in the scene browsing function that indicates a frame to be displayed. When a new scene record is created, the value of the frame pointer field 524 is set equal to the value of the begin frame field of the same record if the begin frame field has a value and is set to 1 otherwise.

Figure 10A:
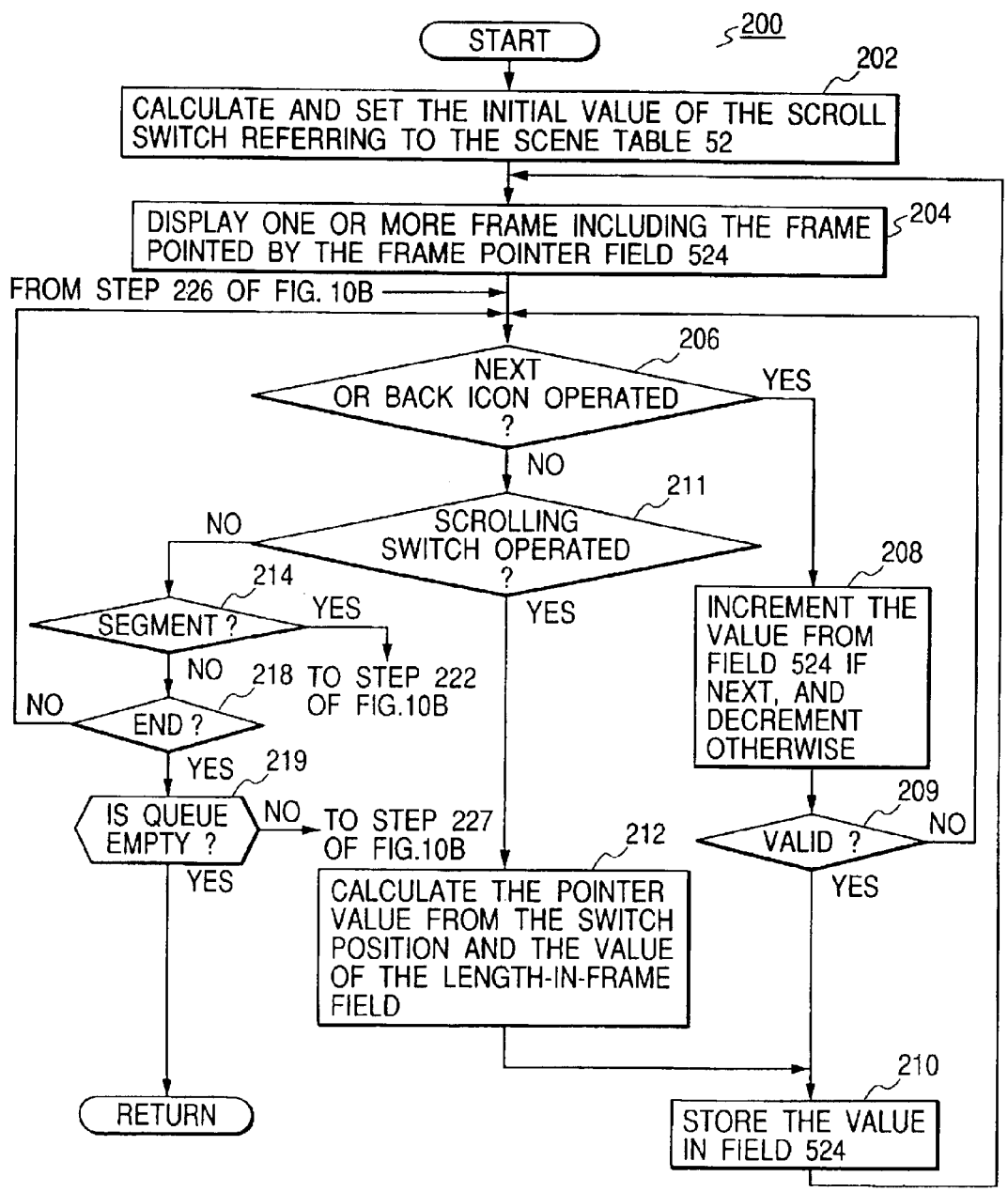
FIGS. 10A and 10B, when combined, constitute a flowchart showing an exemplary operation of a browsing and segmentation subroutine 200 according to the principles of the invention.
Figure 10B:
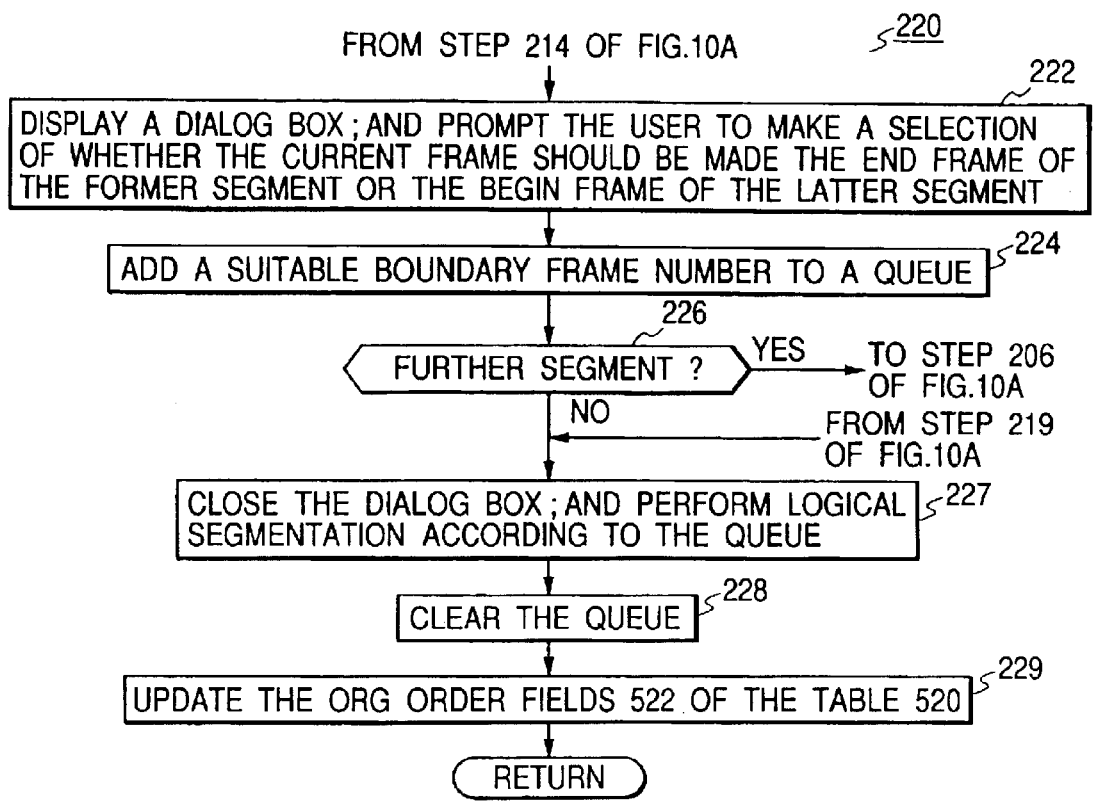

FIGS. 10A and 10B, when combined, constitute a flow-chart showing an exemplary operation of a browsing and segmentation subroutine 200 according to the principles of the invention. If the user performs a predetermined operation such as a clicking on a scene browser icon, a selection of an item "Browse Scene" from the menu, etc. while specifying a desired one of the scene indexes displayed in the scene display area 43, then the main routine of the video editing program 20 calls the browsing and segmentation subroutine 200. Then, the CPU begins executing the subroutine 200 with step 202, where the CPU calculates and sets the initial value of a scrolling switch 48 of a scroll bar 49 from the values of the begin and end frame fields and the frame pointer field 524 of the specified scene record in step 202. The calculation in this case is a well-known rule-of-three sum. It is assumed that there is a not-shown scroll bar 94 routine which outputs a relative position information on the scrolling switch 48 in response to an operation of the user with a capability of setting the initial position of the switch 48 according to an argument passed in a suitable form.

Figure 11:
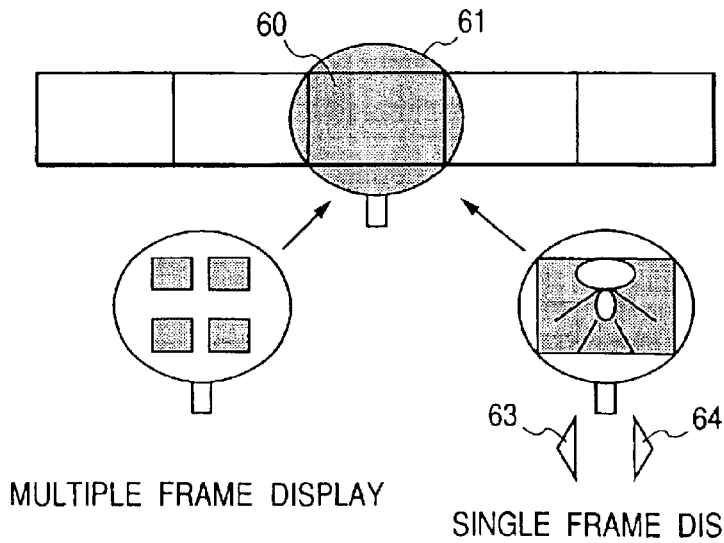
FIG. 11 is a diagram showing two exemplary ways of frame display in the scene browsing function.

In step 204, the CPU displays one or more frame including the frame pointed by the frame pointer, i.e., the value of the frame pointer field 524 of the scene record of the specified scene in a predetermined manner. FIG. 11 is a diagram showing two exemplary ways of frame display in the scene browsing function. As shown in FIG. 11, a plurality of frames including the frame identified by the frame pointer 524 may be displayed in a display area or view window 61 created over the specified scene index 60 (a multiple frame display), or the single frame identified by the frame pointer 524 may be displayed in a view window 61. A next and back icons 63 and 64 are preferably displayed near the view window 61, e.g., below it.

If the user clicks on either the next 64 or back 63 icon in step 206, then the CPU increments the value obtained from the pointer field 524 in case of the next icon 64 and decrements the value otherwise in step 208. The CPU makes a test, in step 209, to see if the value or the frame number is in the range from the begin frame number to the end frame number of the scene in question. If so, then the CPU stores the value in the pointer field 524 in step 210 and goes back to step 204 to display an adjoining frame. Otherwise, the CPU returns to decision step 206. If either the next or back icon has not been operated in step 206, the CPU proceeds to decision step 211, where the CPU makes a test to see if the user operates the scrolling switch 48. If so, then in step 212 the CPU calculates the value of frame pointer 524 from the relative position data of the scrolling switch 48 on the scroll bar 49 and the values of the begin and end frame fields of the scene table 520 and proceeds to the above described step 210 to display frame(s) near a desired position.

If the test result is NO in step 211, then the CPU makes another test in step 214 to see if the user issues a segmentation command. If so, the CPU proceeds to step 222 of FIG. 10B to perform a segmentation as described later. Otherwise, the CPU makes a test in step 218 to see if the user desires to terminate the browsing mode. If not, then the CPU returns to step 206. If the test result is Yes in step 218, then the CPU returns to the main routine of the video editing program 20 after ascertaining in step 219 that a predetermined queue (used in segmentation as described below) is empty.

The user is preferably permitted to control the size of the view window 61.

It is noted that the value of the frame pointer field 524 is retained after the termination of a browsing mode for a scene. This ensures the resumption of the browsing mode for the scene.

The user is permitted to segment a scene at a desired frame thereof while browsing the scene as described in connection with steps 214. If the user issues a segmentation command in a predetermined manner in step 214, the CPU proceeds to step 222 of FIG. 10B. In step 222, the CPU displays a dialog box to ask the user whether the current frame should be made the end frame of the former segment or the begin frame of the latter segment and prompt the user to select either of the former and the latter. If the user select one of the two (he or she may change his or her mind and desire to quit the segmentation), then, in step 224, the CPU adds the current frame number as it is to a predetermined (end frame) queue if the user selects the former (i.e., desires to make the current frame the end frame of the former segment), and adds the current frame number minus one to the predetermined queue if the user selects the latter. In step 226, the CPU asks the user whether he or she desires to segment the scene further. If so, the CPU returns to step 206 of FIG. 10A to continue the browsing for further segmentation; thereafter operates as described above; and returns to step 222 from step 214 of FIG. 10A or proceeds to step 227 from step 219 of FIG. 10A. If the answer is NO in step 226 or if the queue is not empty in step 219, then the CPU proceeds to step 227, where the CPU closes the dialog box and performs logical segmentation of the scene according to the contents of the predetermined queue.

Specifically, the CPU adds to the scene table 520 scene records having the frame numbers contained in the queue as respective end frame numbers (in this example); deletes the scene record and the scene index file of the segmented scene from the scene table 520 and the SceneIndexes directory, respectively; and adds scene index files of the new scenes to the SceneIndexes directory. Again, the new scenes obtained from the segmentation of the scene are each named by simply appending a delimiter (e.g., "." in this example) and an additional ID part (e.g., a serial number in this case) to the scene ID of the scene. The delimiter may be any suitable symbol. The additional ID part may be any suitable expression including a sequential notation such as a serial number, an alphabet, etc. For example, if the scene CA.2 is segmented into three, then the new scenes are CA.2.1 through CA.2.3. In this way, the invention ensures recursive segmentations and facilitates undo operation.

After step 227, the CPU clears the queue in step 228. Finally, the CPU updates the ORG ORDER fields 522 of the scene table 520 for the sake of a relative position restoration function (detailed below) in step 229, and returns to the main routine of the video-editing program 20.

Grouping Scenes

It is assumed that the video editing system 100 is provided with a flexible scene specifying function which can specifying a plurality of scenes including successive ones and separated ones to pass them to other function. The user is permitted to group the scenes specified by a specifying operation into a single scene by issuing a grouping command.

In grouping the specified scenes, the scenes can be ordered in some ways. Since the scenes are generally classified into two types—an order-sensitive type and an independent type, scene types have to be considered in grouping. A group of scenes of the order-sensitive type are scenes obtained by a segmentation of a scene, i.e., scenes the names of which each include at least one delimiter in the scene-naming scheme. Scenes of the independent type are raw videos or scenes which have experienced no segmentation (and accordingly have no delimiter in respective names).

Also, the user is permitted to specify one of ordering schemes—a time sequence and a specified sequence except when the specified scenes are of the independent type. If the specified scenes are of the independent type, the only ordering scheme the user can specify is the specified sequence.

It is noted that the above-mentioned scene specifying function reports not only the specified scene IDs but also the specified orders of the IDs.

Figure 12:
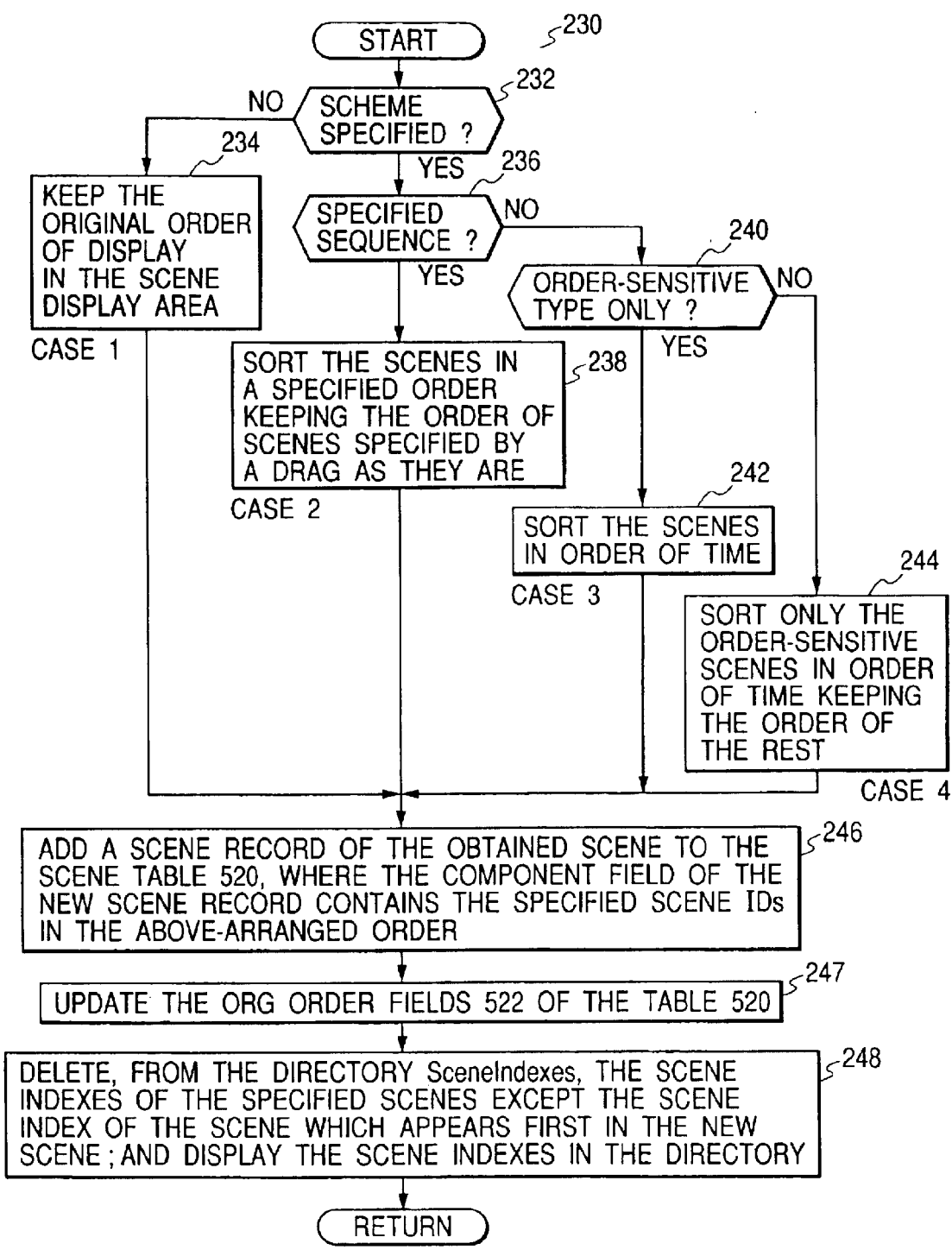
FIG. 12 is a flowchart showing an exemplary operation of a grouping subroutine 230 according to the principles of the invention.

FIG. 12 is a flowchart showing an exemplary operation of a grouping subroutine 230 according to the principles of the invention. If the user issues a grouping command with desired scenes specified, the CPU enters the grouping subroutine 230. In step 232, the CPU makes s a test to see if the user specified any ordering scheme. If not, the CPU keeps the relative positions of the specified scene indexes in the scene display area 43 in step 234 (Case 1). If the user has specified any ordering scheme in step 232 and if the scheme is the specified sequence scheme in step 236, the CPU sorts the scenes in the specified order while keeping the order of scenes specified by a drag of the mouse 118 as they are in step 238 (Case 2). If the scheme is not the specified sequence (but the time sequence scheme) in step 236, then the CPU makes a test in step 240 to see if all of the specified scenes are of the order-sensitive type. If so, the CPU sorts the scenes in order of time in step 242 (Case 3). Otherwise, the CPU sorts only the order-sensitive scenes in order of time while keeping the order of the rest in step 244 (Case 4).

After any of steps 234, 238, 242 and 244, the CPU proceeds to step 246, where a scene record of the scene into which the specified scenes are grouped is added to the scene table 520. In this case, a COMPONENTS field 526 of the scene table 520 contains scene IDs of the specified scenes in an order determined in the above-described manner. In step 247, the CPU updates the ORG ORDER fields 522 of the scene table 520 as detailed later. Then, in step 248, the CPU deletes, from the directory SceneIndexes, the scene indexes of the specified scenes except the scene index of the scene which appears first in the new scene, and displays the scene indexes in the directory SceneIndexes.

It is noted that the begin and end frame fields of a grouped scene have no values because these values can not be determined (except for a special case as detailed later) till a clip list which defines an edited video program is completed.

Figures 13, 14:
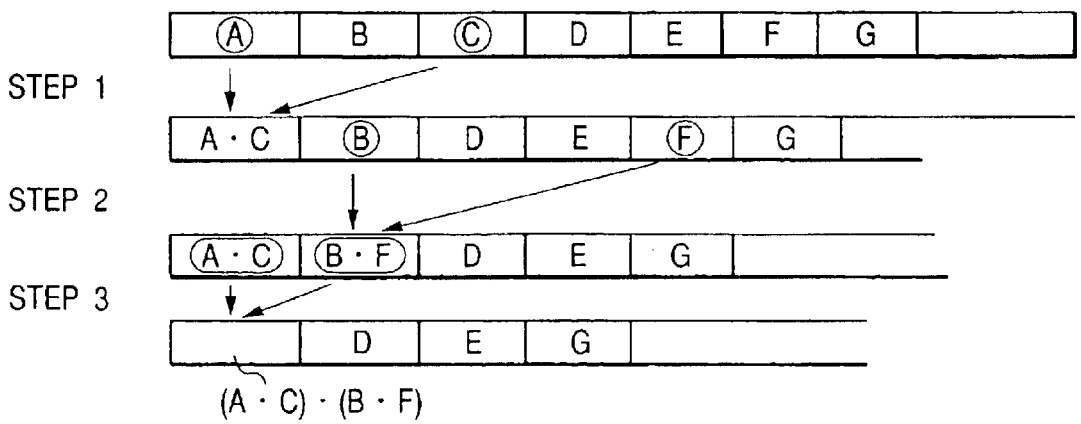
FIG. 13 is a diagram illustrating how scenes are grouped in accordance with the principles of the invention.
FIG. 14 is a diagram illustrating an example of grouping of grouped scenes in accordance with the principles of the invention.

FIG. 13 is a diagram illustrating how scenes are grouped in accordance with the principles of the invention. In FIG. 13, CURRENT STATE shows the "current state" of the scenes. In the rows labeled SPE. 1 and SPE. 2, isolated numerals each indicate the order of specification of the scene index in the same column, and a numeral with an overline extending across a plurality of scene indexes indicates that the scene indexes along the overline are specified in the order specified by the numeral.

Specifically, the row SPE. 1 indicates that CC is first specified and then CA.2, CA.1 and CA.3 are specified en bloc by a drag operation. The three following rows labeled CASEs 1(1), 2(1) and 4 show the states after grouping operations executed for respective cases (described above) under the specification condition SPE.1. Likewise, the row SPE. 2 indicates that CA.5, CA.2 and CA.1 are specified one by one in this order. The three following rows CASEs 1(2), 2(2) and 3 show the states after grouping operations executed for respective cases under the specification condition SPE.2.

It is noted that though each grouped scene is shown as proportional in length to the number of constituent scenes in FIG. 13, the scene index of the first constituent scene is actually displayed for each grouped scene in the scene display area 43.

It should be noted that the above-described grouping function is recursive. That is, the grouping command can be applied to a scene group all or part of which are grouped scenes. In grouping scenes including grouped scene(s), grouped scene(s) is (or are) dealt with as independent scenes. For this reason, only the above-mentioned first and second cases are possible in a recursive grouping.

FIG. 14 is a diagram illustrating an example of grouping of grouped scenes in accordance with the principles of the invention. In FIG. 14, encircled numerals denote specified scenes to be grouped. In step 1, scenes A and C are grouped into a scene A·C. In step 2, scenes B and F are grouped into a scene B·F. And, in step 3, the grouped scenes A·C and B·F are again grouped into a scene (A·C)·(B·F). It is also noted that grouped scenes (A·C)·(B·F) and A·C·B·F are identical to each other and accordingly provide identical videos. However, it is preferable to store the component scenes in the components field 526 of the scene table 520 in a format like the former expression in order to facilitate a so-called undo operation.

Scene Clipping Based on Selection by Default

Figure 15:
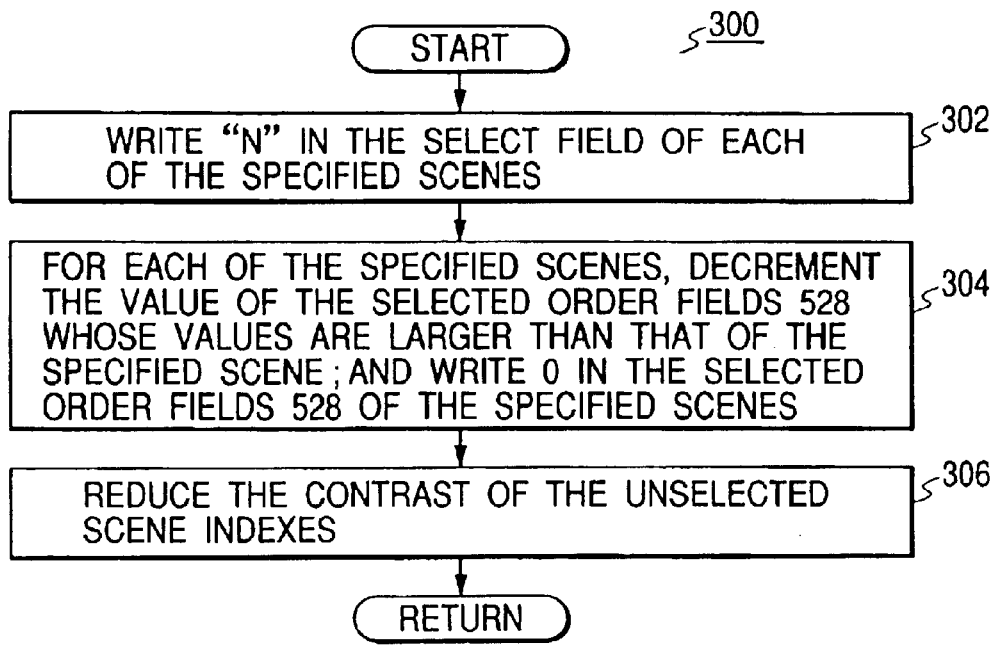
FIGS. 15 and 16 are flowcharts showing exemplary operations of an unselection subroutine 300 and a selection subroutine 310 according to the principles of the invention.
Figure 16:
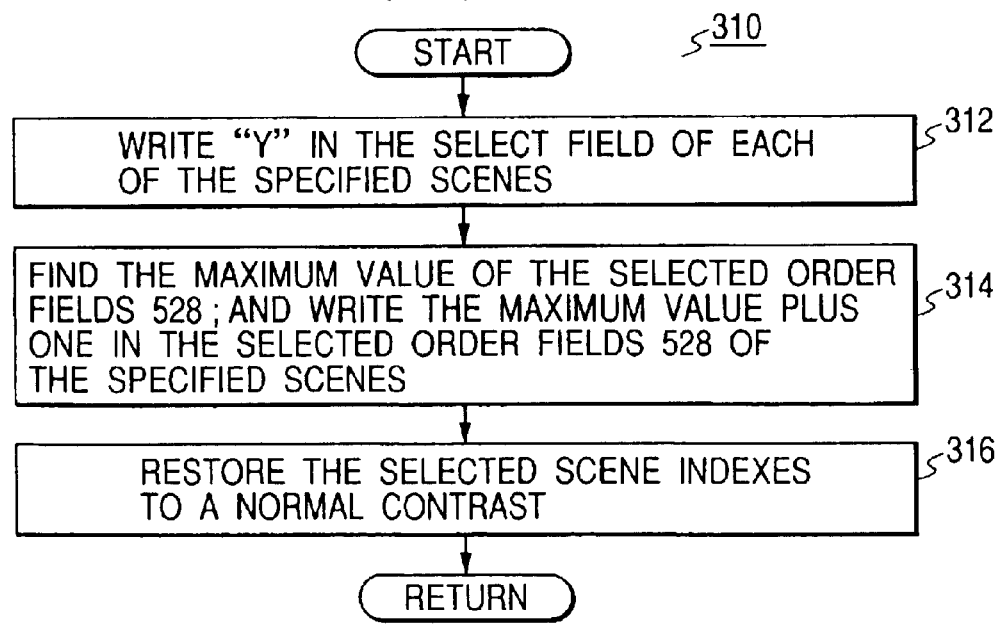

As shown in FIG. 7, the select fields of the scene table 520 are initially filled with Y's (for Yes's). This means that all of the scenes are initially in the state of being selected for use in a edited video program. Accordingly, in the video editing system 100, the user selects desired scenes by making unnecessary scene in an unselected state. FIGS. 15 and 16 are flowcharts showing exemplary operations of an unselection subroutine 300 and a selection subroutine 310 according to the principles of the invention.

If the user specifies unnecessary scene(s) which is (are) in selected state by means of the above mentioned scene specifying function and clicks on a UNSELECT button (icon) 50 on the display screen 40, then the unselection subroutine 300 is invoked. In step 302, a value "N," which means an unselected state, is written in each of the select field(s) of the scene table 520 associated with the specified scene(s). Then, after updating the SELECTED ORDER fields 528 of the scene table 520 (as detailed later) in step 304, the CPU reduces in contrast or shades the scene index(es) of the unselected scene(s) displayed in the scene display area 43 so that the user can easily discriminate between selected scenes and unselected scenes, in step 306.

Similarly, the user can select one or more unselected scene again by specifying them with the scene specifying function and clicking on a SELECT button 51 on the display screen 40. In this case, the selection subroutine 310 of FIG. 16 is invoked. In step 312, a value "Y," which means an selected state, is written in each of the select field(s) of the scene table 520 associated with the specified scene(s). Then, after updating the SELECTED ORDER fields 528 of the scene table 520 (as detailed later) in step 314, the CPU displays the scene index(es) of the selected scene(s) in the scene display area 43 in the normal contrast in step 316.

In this way, the video editing system 100 permits the user to easily change between selected and unselected states of each scene.

It is noted that this specific embodiment is using two buttons SELECT and UNSELECT for scene selection, however the scene selection may be realized with a single button. In this case, instead of writing a predetermined value Y or N in each select field, the value of each select field is read out, inverted, and then restored to the select field.

Clip Sorting

Once all scenes that the user thinks to be necessary are selected, the order of the selected scenes or clips will be arranged. For this purpose, the editing system 100 is provided with a sort function. The sort function acts only on the selected scenes. That is, after the sort command is executed, the selected sorted scenes are disposed from the beginning of the scene display area 43, and the unselected scenes are disposed after the sorted scenes.

Figure 17:
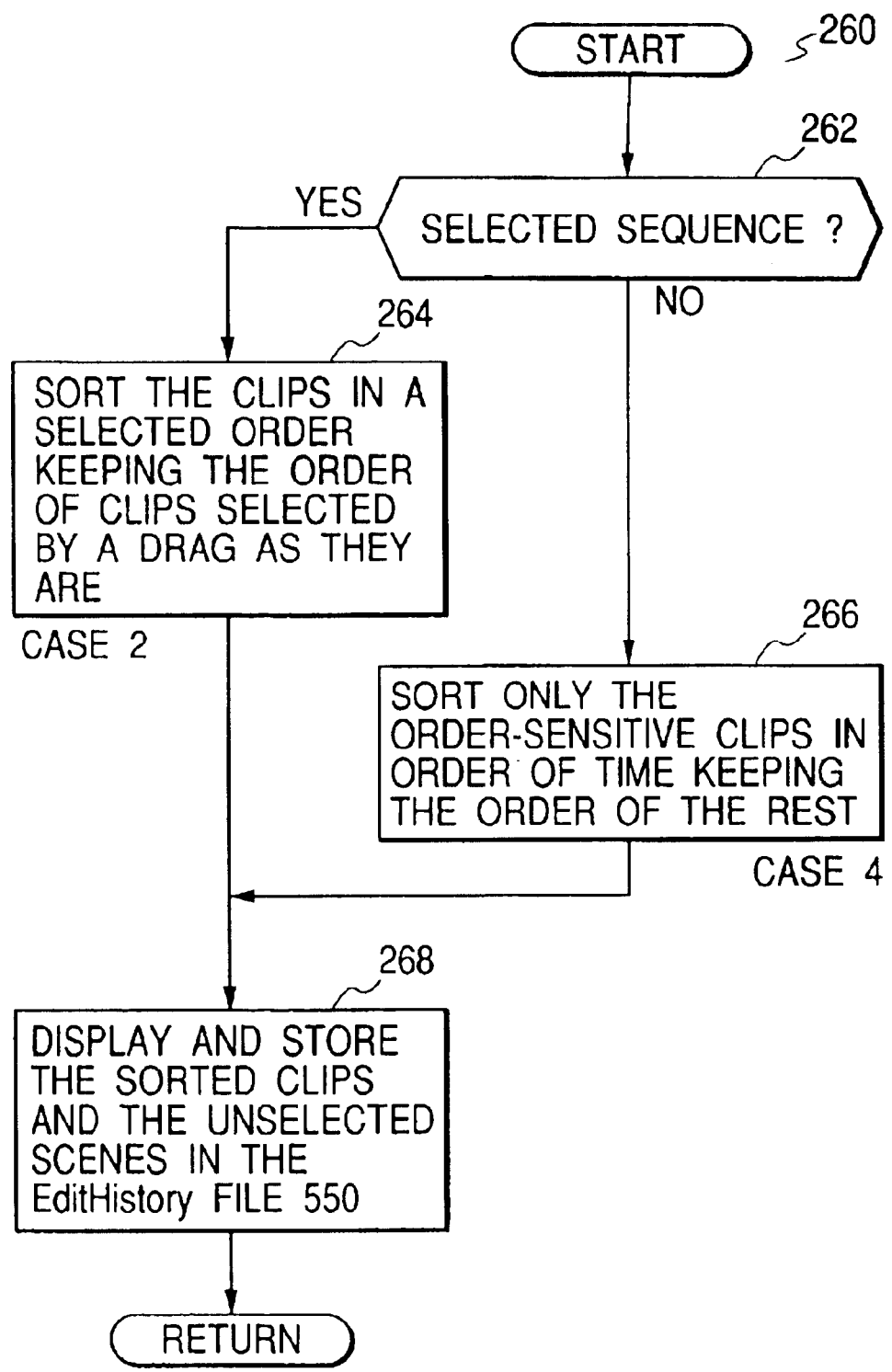
FIG. 17 is a flowchart showing an exemplary operation of a sort subroutine 260 according to the principles of the invention.

FIG. 17 is a flowchart showing an exemplary operation of a sort subroutine 260 according to the principles of the invention. If the user issues a sort command specifying one of two sorting schemes, i.e., a sort in selected order and a sort in order of time, then the sort subroutine 260 is invoked. If the sort in selected order (selected sequence) is specified, the CPU sorts the clips in the selected order while keeping the order of clips selected by a drag as they are.

For this purpose, the SELECTED ORDER fields 528 of the scene table 520 are filled with "1" at the time of creation of the record and thereafter updated each time a selection or unselection command is executed as mentioned above in connection with FIGS. 15 and 16. Specifically, in an unselection operation (step 304 of FIG. 15), for each of the specified scenes, the CPU decrements the value of the selected order fields 528 whose values are larger than that of the specified scene and writes a value "0" in the selected order fields 528 of the specified scenes. Also, in a selection operation (step 314 of FIG. 16), the CPU searches the selected order fields 528 for the maximum value; and writes the maximum value plus one in the selected order fields 528 of the specified scenes. This enables clip sorting in the selected order.

Again in FIG. 17, if the sort in time sequence is specified, the CPU sorts only the order-sensitive clips (i.e., selected order-sensitive scenes and selected grouped scenes each including at least one order-sensitive scene) in order of time while keeping the order of the rest of the clips in step 266.

Following step 264 or 268, the CPU displays the sorted clips and the unselected scenes in the scene display area 43 and registers them in a history file 550 in the SceneData directory. In order to facilitate the undo function, each time the user executes a command, the record of the command, command parameters and a list of the scene (or scene index) IDs arranged in order of displayed scene indexes in the scene display area 43 is added to the record list in the history file 550.

Relative Position Restoration of a Specified Scene

The user is also permitted to move a scene index from one window to another window in a well-known manner by a drag and drop operation. In the course of editing process using selections, unselections and moves, the user may sometimes desire to restore a specific scene to its original position. This is not achieved by the conventional undo function which restores the previous state step by step.

According to the principles of the invention, the user can restore a specific scene to its relative position with respect to the next scene or the back scene at the time the last segmentation or grouping command has been executed. For this purpose, the ORG ORDER fields 522 of the scene table 520 are updated each time a segmentation or a grouping is executed so as to retain the order of the displayed scene indexes as shown in step 229 of FIG. 10B and step 247 of FIG. 12. Also, as practiced in conventional video editing system, the state of the scene indexes in the scene display area 43 is stored in a history file 550 in the SceneData directory of FIG. 5 each time any editing command (e.g., a segmentation, a grouping, a select, an unselect, a move and this restoration, too) has been executed. However, this operation is not shown in the flowcharts of the accompanying drawings for the purpose of simplicity.

Figure 18:
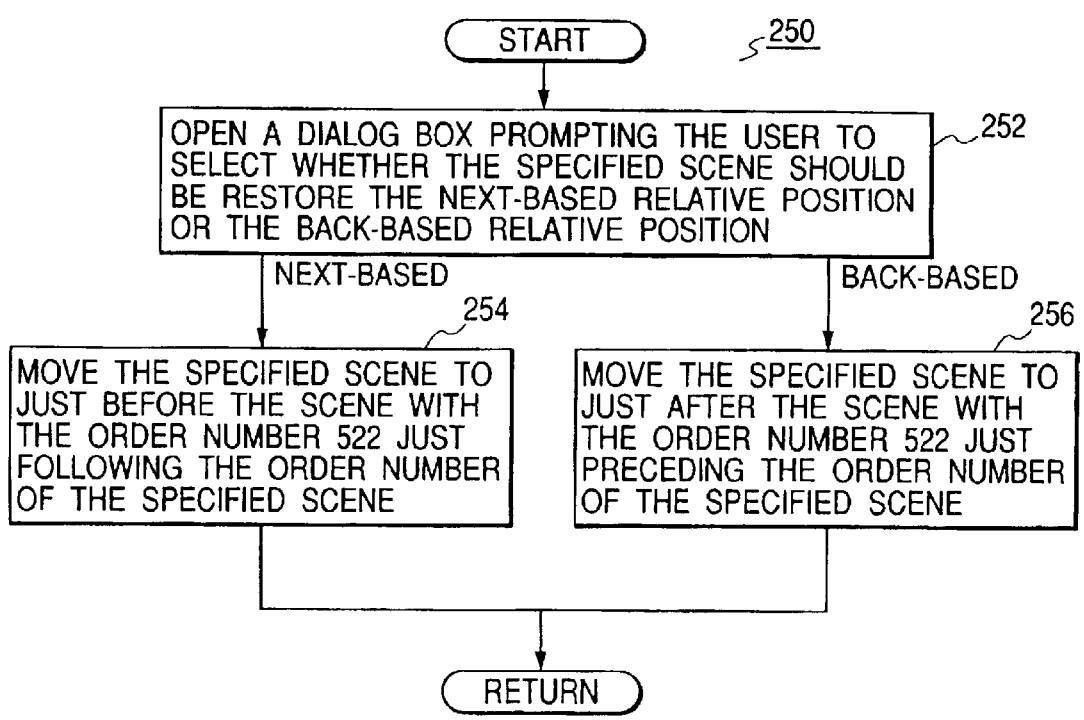
FIG. 18 is a flowchart showing an exemplary operation of a relative position restoration subroutine 250 according to the principles of the invention.

FIG. 18 shows an exemplary operation of a relative position restoration subroutine 250 according to the principles of the invention. If the user clicks on a RESTORE button 52 with a desired scene index specified, then the CPU enters the subroutine 250. In step 252, open a dialog box, in which the user prompted to select whether the specified scene should be restored to the next-based relative position or the back-based relative position. If the user selects the next-based relative position, the specified scene is moved to just before the scene with the order number 522 just following the order number of the specified scene. If the user selects the back-based relative position, the specified scene is moved to just after the scene with the order number 522 just preceding the order number of the specified scene. And, the control is returned to the main routine of the video-editing program 20. Though not shown in FIG. 18, the resultant state of the scenes is also stored in the history file 550 for future undo operation.

Figure 19:
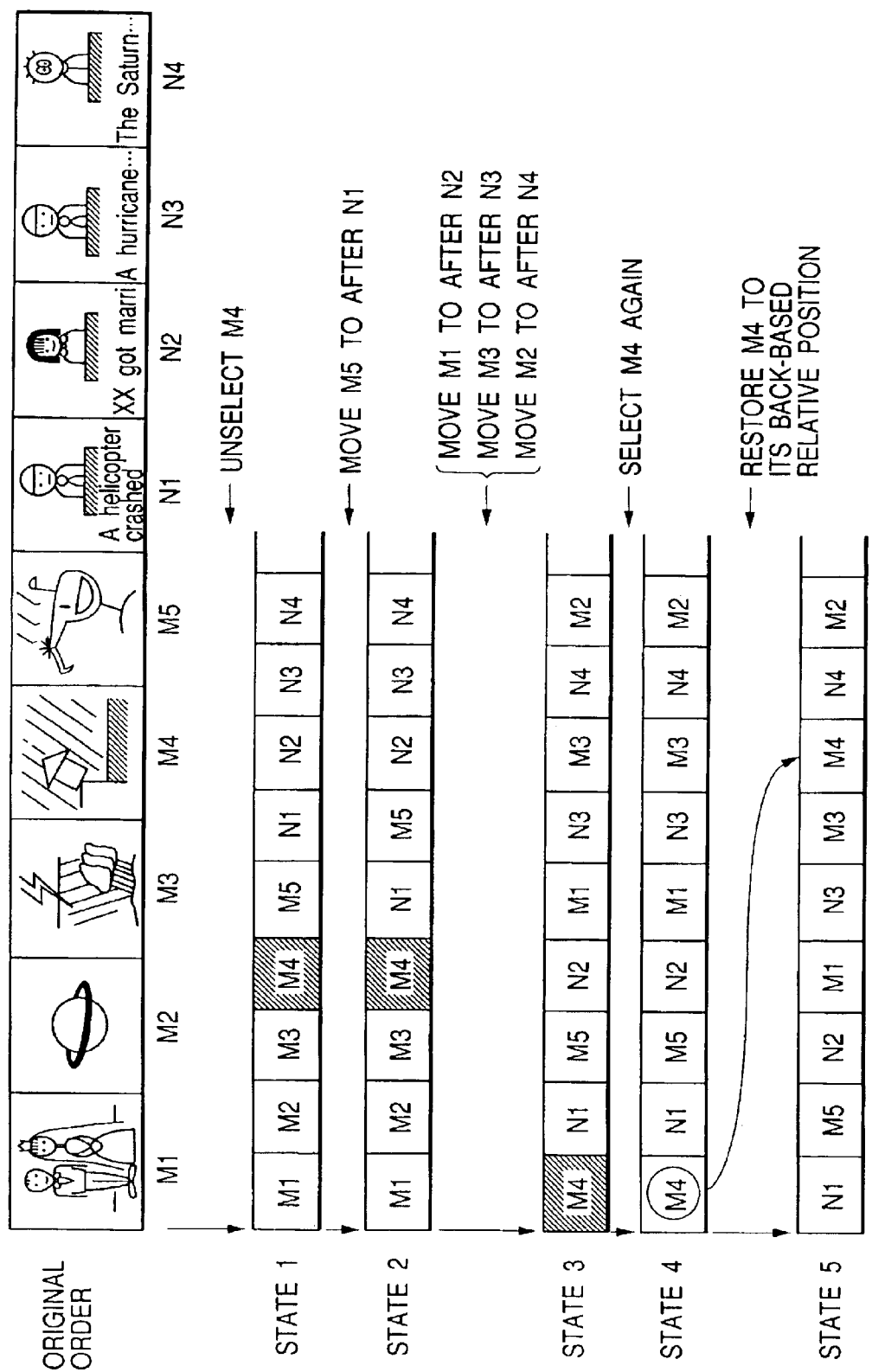
FIG. 19 is a diagram illustrating how the relative position restoration function works in accordance with the invention.

For better understanding the restoration function, we will take an example. FIG. 19 illustrates how the relative position restoration function works in accordance with the invention. In the top row labeled "ORIGINAL ORDER" of FIG. 19, there are displayed scene indexes for five collected material videos M1 through M5 and four narration videos prepared after the material collection, N1 through N4. Unselecting M4 results in STATE 1, where the scene index M4 is displayed in a reduced contrast. Moving M5 to after N1 results in STATE 2, where M5 is inserted after N1. Moving M1 to after N2, M3 to after N3, and M2 to after N4 results in STATE 3. And, selecting M4 again results in STATE 4. If the user issues a relative position restoration command while specifying M4, then the scene index M4 is automatically inserted after M3 because M4 was placed after M3 in the original order.

Thus, only a desired scene can be advantageously restored to its original position without neither changing the order of the other scenes nor going back step by step.

Clamping a Scene to its Original Play Time

The user obtains a desired set of ordered clips, i.e., a so-called clip list through an editing process using above-described various functions. An edited video program is assembled from the source videos in the Video directory on the basis of the clip list, which is derived from the last registered record in the history file 550. Generally speaking, the assembling is such that video segments corresponding to the clips contained in the clip list are concatenated in the listed order so as to adjoin the first (or begin) frame of a preceding scene and the last (or end) frame of the scene following the preceding frame.

Figure 20:
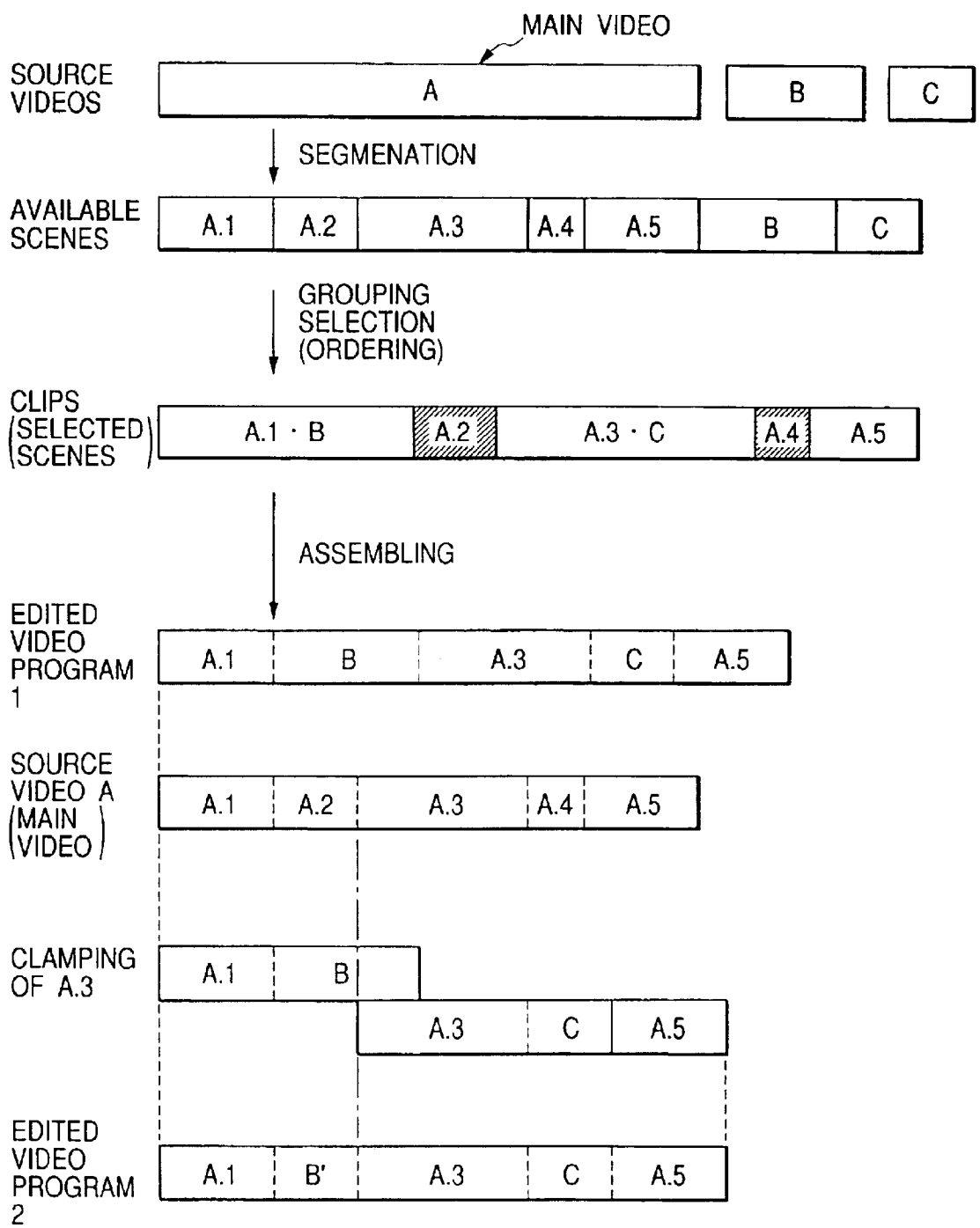
FIG. 20 is a diagram showing an example of a video program assembling process attended with the clamping of a clip in accordance with the principles of the invention.

FIG. 20 illustrates this process. In FIG. 20, one of the source videos A, B and C, i.e., a MAIN VIDEO A is segmented into five scenes A.1, A.2, A.3, A.4 and A.5. Then, a series of grouping and selections resulted in three CLIPS A.1·B, A.3·C and A.5, which are assembled into an EDITED VIDEO PROGRAM 1.

However, the user may desire that even in the edited video program (PROGRAM 2) a specific scene, say, A.3 should be played in the same timing as in the original SOURCE VIDEO A. For this purpose, a kind of CLAMPING OF A.3 (to the source video A) is performed in the concatenation of scenes A.1·B and A.3·C. In this specific example, the scene B has a latter part thereof discarded, resulting in a shorted scene B' in the EDITED VIDEO PROGRAM 2.

Figure 21:
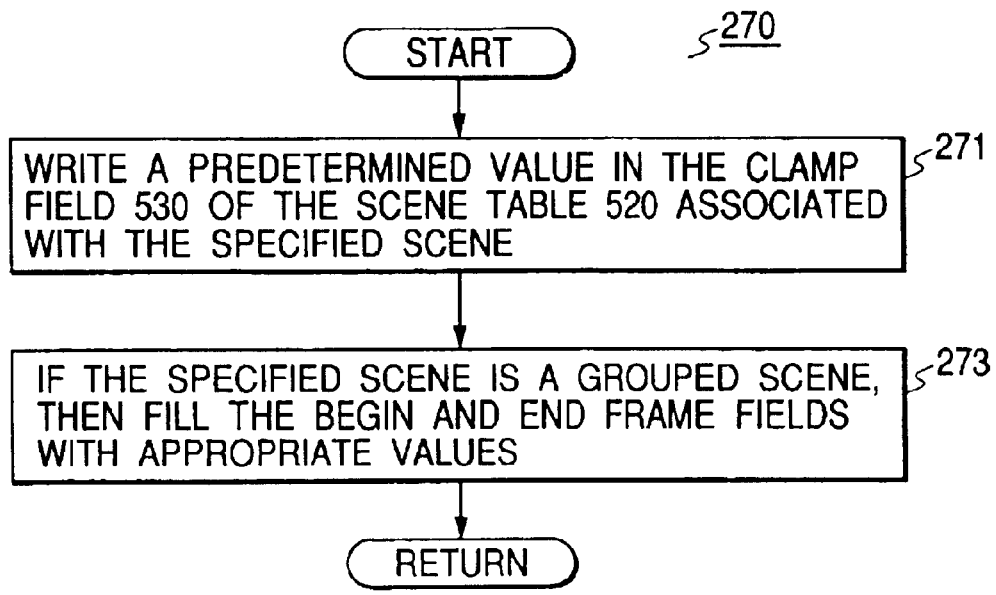
FIG. 21 is a flowchart showing an exemplary operation of a clamp setting subroutine according to the principles of the invention.

Thus, according to the principles of the invention, the user is permitted to issue a clamp command specifying one of the scenes into which a source video has been segmented (i.e., a divisional scene) or a grouped scene that begins with such a divisional scene. FIG. 21 is a flowchart showing an exemplary operation of a clamp setting subroutine 270 according to the principles of the invention. In step 271, the CPU writes a predetermined value in the clamp field 530 of the scene table 520 associated with the specified scene. If the specified scene is a grouped scene, then the CPU fills the begin and end frame fields with appropriate values in step 273. Specifically, the CPU copies the value of the begin frame field of the first constituent scene of the specified scene to the begin frame field of the specified scene, and writes the copied value plus the length-in-frame field value minus one in the end frame field of the specified scene. After step 273 or after step 271 if the specified scene is not a grouped scene, the CPU returns to the main routine.

As described above, setting a value in a clamp field 530 of a divisional scene or a grouped scene beginning with a divisional scene causes the divisional scene to be clamped to the source video of the divisional scene. That is, the divisional scene is played in the same timing both in the source video and in a edited video program.

Scene Transition Processing

Figure 22:
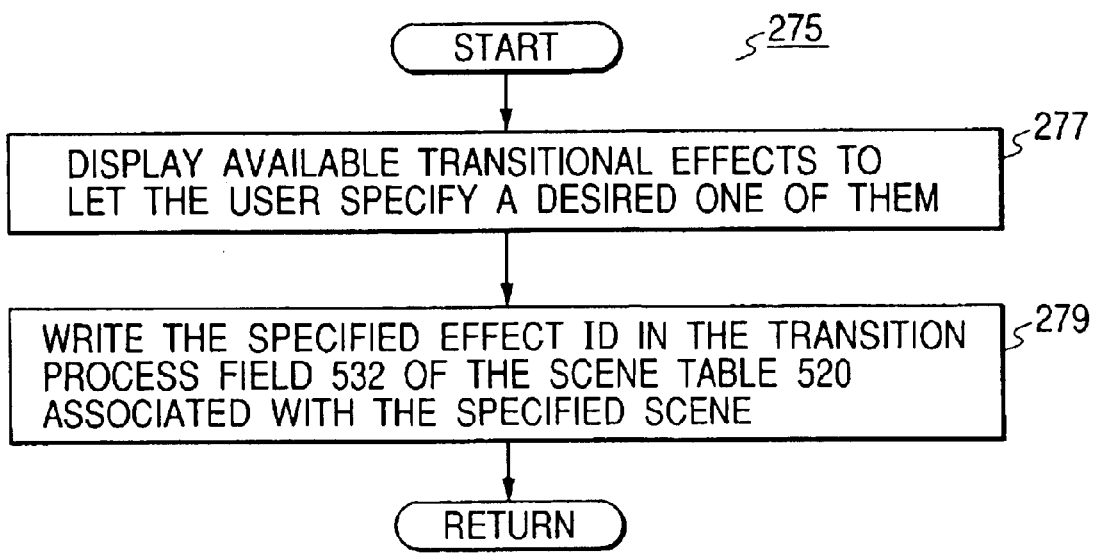
FIG. 22 is a flowchart showing an exemplary operation of a transitional effect setting subroutine according to the principles of the invention.

The user is permitted to set a special effect on any scene to add an image effect to the transition between the scene and the next scene. FIG. 22 shows an exemplary operation of a transitional effect setting subroutine 275. If the user issues a transitional effect setting command while specifying a desired scene or clip, then the subroutine 275 is invoked. In step 277, the CPU displays available image effects for scene transitions, e.g., dissolve, fade, and wipe so that the user can specify a desired one of the displayed effects. In step 279, the CPU writes an effect ID of the specified image effect in a transitional effect field 532 of the scene table 520 associated with the specified scene or clip, and returns to the main routine.

Video Program Generation

After completing a clip list by using the above-described features of the video editing system 100, the user finally issues a creation or compile command (in user operation step 36) to create an edited video program 3 according to the obtained clip list (in system step 26) as shown in FIG. 3. The clip list is preferably stored in a file ProgramX in the directory SceneData or in a different directory CLIPS (not shown). It is noted that the user may create some clips from the same source videos. In such a case, the clip files are preferably stored in the different directory.

Figure 23:
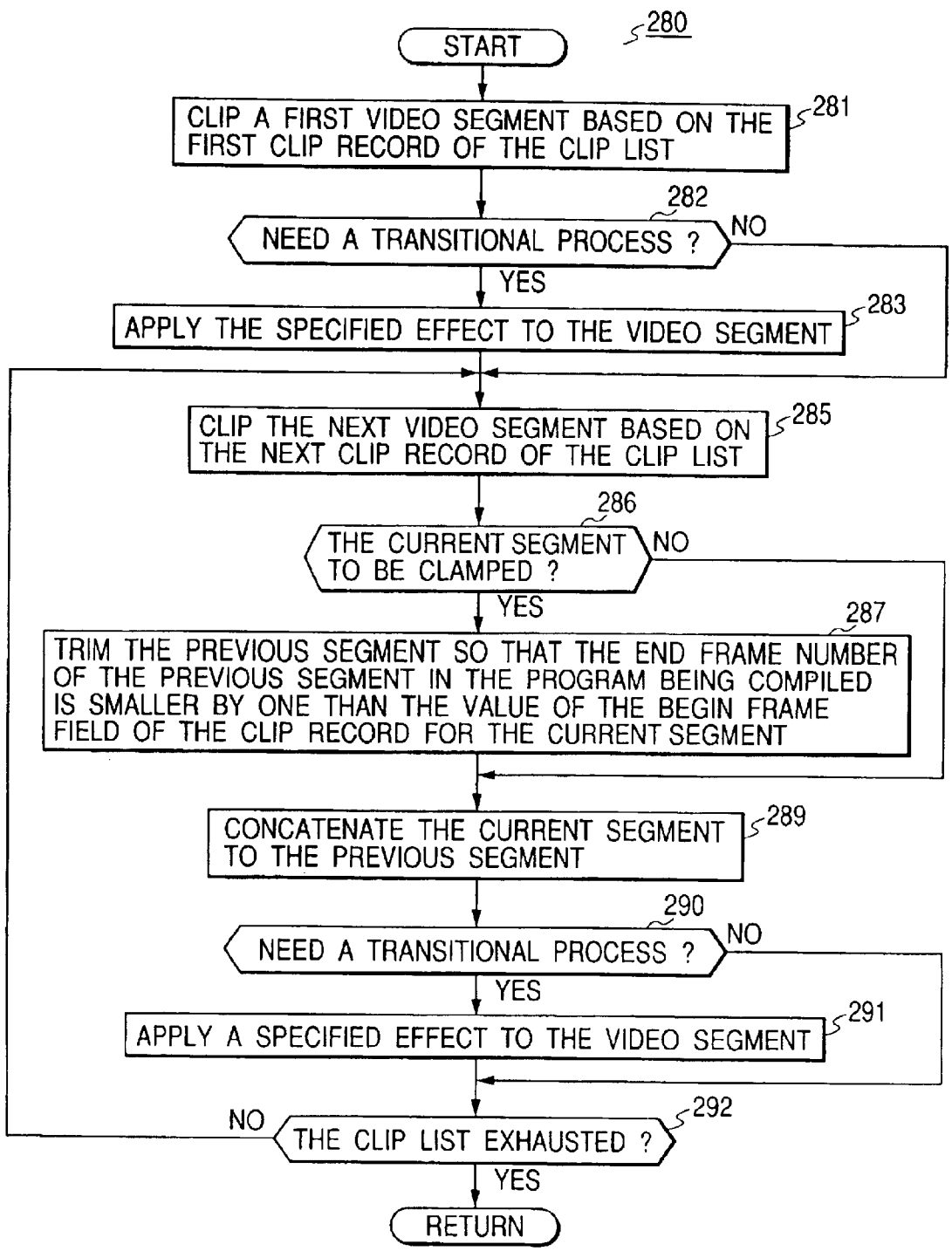
FIG. 23 is a flowchart showing an exemplary operation of a video program compiler subroutine according to the principles of the invention.

FIG. 23 shows an exemplary operation of a video program compiler subroutine 280 called in response to an issuance of the creation or compile command. In FIG. 23, the CPU clips a first video segment identified by the first clip (record) of the clip list in step 281. In step 282, a test is made to see if the video segment needs a transitional process. If so, the specified video effect is applied the segment in step 283.

Otherwise, or after step 283, the CPU clips the next video segment according to the next clip record of the clip list in step 285. In step 286, a test is made to see if the current segment is to be clamped. If so, then in step 287 the CPU trims the previous video segment so that the end frame number of the previous segment in the program being compiled is smaller by one than the value of the begin frame field of the clip record of the current segment.

Otherwise, or after step 287, the CPU concatenates the current segment to the previous segment in step 289. Then, in step 290, a test is made to see if the current segment needs a transitional process. If so, the CPU applies the specified video effect to the segment in step 291. Otherwise, or after step 291, the CPU makes a test in step 292 to see if the clips in the clip list have been exhausted. If so, then the CPU returns to the main routine. Otherwise, the CPU returns to step 285 for the next clip. Thus, an edited video program is generated.

Embodiment II

Figure 28:
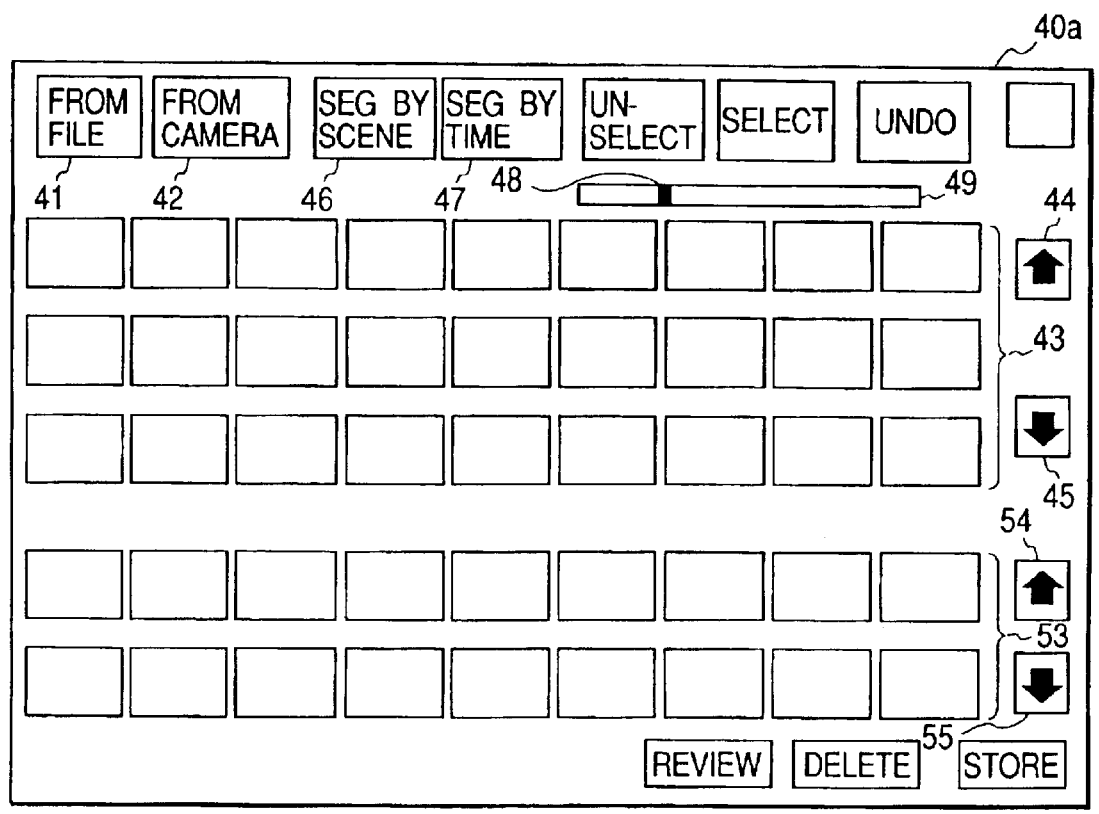
FIG. 28 is a diagram showing an example of an edit display screen of a second illustrative embodiment of the invention.

The second illustrative embodiment of the invention is basically the same as the above-described first embodiment except that the display screen 40*a* of the second embodiment has not only the scene display area 43 including the scroll buttons 44 and 45 but also a clip display area 53 including scroll buttons 54 and 55 as shown in FIG. 28. Since the scene indexes (of the unselected scenes) and the clip indexes (of the selected scenes) are displayed in separate areas 43 and 53 in the second embodiment, this facilitates both the selection of scenes and the arrangement of the order of the clips.

The following description will be focused on the differences between the two embodiments.

In FIG. 3, the selected scene indexes or clip indexes are displayed not in the scene display area 43 but in the clip display area 53.

The data-related directory configuration of FIG. 5 may be as it is. Since scenes and clips are discriminated by the select field of the scene record for the scene or clip in question, the scene and clip indexes may be stored in the same directory SceneIndexes. For the same reason, the scene table 520 contains the records for both the scenes and the clips. For the purpose of simplicity, the term "scene record" will be used for a record of either kind regardless of whether the record is for scene or clip.

In the first embodiment, each record of the history file 550 is comprised of a command, command parameters and a list of the scene (or scene index) IDs arranged in order of displayed scene indexes in the scene display area 43; and the list of scene IDs includes both the scene IDs and the clip IDs. On the other hand, each record of the history file according to the second embodiment is comprised of a command, command parameters, a list of the scene (or scene index) IDs arranged in order of displayed scene indexes in the scene display area 43, and a list of the clip (or clip index) IDs arranged in order of displayed clip indexes in the clip display area 53.

A video editing system according to the second illustrative embodiment provides almost the same functions as the above-described system 100. Since two video display areas are available, the capability of the system will be listed with the availability thereof in the scene and clip areas.

In the following table, 0 denotes availability of a corresponding function and x denotes unavailability of a corresponding function.

| | Functions | | Scene | Clip |
|---|---|---|---|---|
| a) | browsing with next and back icons and/or a scroll bar | | 0 | 0 |
| b) | recursive scene/clip segmentation available with the browsing function | | 0 | 0 |
| c) | scene/clip specification with a reversing option | | 0 | 0 |
| d) | recursive scene/clip grouping | | 0 | 0 |
| e) | scene clipping based on unselection by default | select | 0 | x |
| | | unselect | x | 0 |
| f) | clip sorting | | x | 0 |
| g) | relative position restoration of a specified scene | | x | x |
| h) | clamping a scene to its original play time (setting) | | x | 0 |
| i) | scene transition processing (setting) | | x | 0 |

As seen in the above table, a) browsing, b) scene/clip segmentation, c) scene/clip specification with a reversing option (, which will be detailed later) and d) recursive scene/clip segmentation are available both in the scene and clip display areas 43 and 53 and achieved in the same manner as in the first embodiment.

However, if a grouping is performed in the scene display area 43, the resultant grouped scene is taken to be selected and accordingly displayed in the clip display area 53. That is, the select field of the scene record for the grouped scene is set for "Y".

The relative position restoration (g) is not available in this embodiment. The clip sorting (f), the clamp setting (h) and the setting of scene transition processing (i) are available only in the clip display area 53, and achieved in the same manner as in the first embodiment.

Scene/Clip Specification With a Reversing Option

Figure 24:
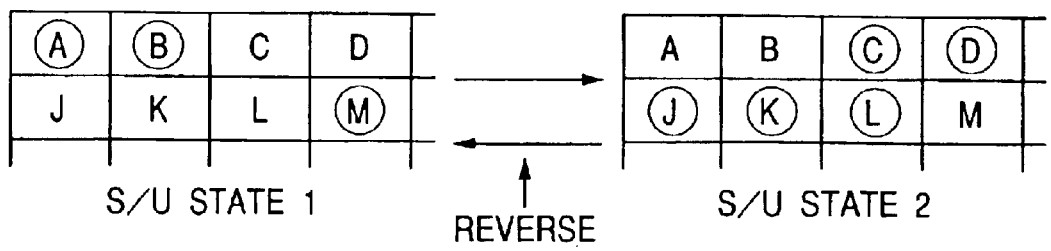
FIG. 24 is a diagram illustrating how the specified/unspecified states of the scenes or clips are reversed.

According to the principles of the invention, once the user specifies one or more scenes or clips in the scene 43 or clip 53 display area, the user can reverse the specified/unspecified state of the scenes or clips. FIG. 24 is a diagram illustrating how the specified/unspecified states of the scenes or clips are reversed. It is assumed that the user has specified scenes (or clips) A, B and M as shown by label "S/U state 1". If the user reverses the state by predetermined simple operation, the state changes from S/U state 1 to S/U state 2 in which scenes C, D, J, K, L are specified. The user can again reverse the state, resulting in the S/U state 1. This enables flexible scene/clip specifications, raising the editing efficiency.

Scene Clipping Based on Unselection by Default

All the scenes are first displayed in the scene display area 43 with no frame displayed in the clip display area 53 as long a clipping or a grouping, which involves clipping, is not performed. That is, the clipping operation of the embodiment is based on a unselection by default scheme.

Figure 25:
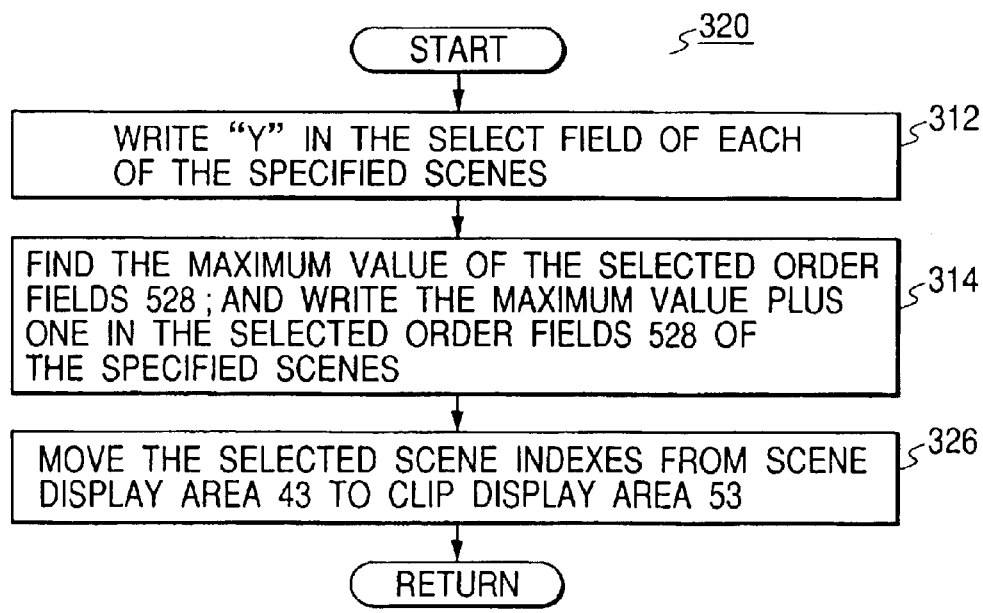

FIGS. 25 and 26 are flowcharts showing exemplary operations of a selection subroutine 320 and a unselection subroutine 330 according to the principles of the invention.

The selection operation 320 of FIG. 25 is identical to that of FIG. 16 except step 326. In step 326, the CPU moves the selected scenes from the scene display area 43 to the clip display area 53.

Since an unselection is performed on the clips in the clip display area 53, steps 332 and 334 of FIG. 26 are identical to the corresponding steps of FIG. 15 if scene's are changed to clip's in steps 302 and 304. Further, in step 330, the CPU moves the selected clips from the clip display area 53 to the scene display area 43.

FIG. 27 is a diagram showing an example of a scene selection in which a selection command is executed after reversing the specified/unspecified state of the scenes. In FIG. 27, SC1 indicates that scenes A and G are selected. If the user issues an selection command in state SC1, it causes the state CL1 in which clip indexes A and G are displayed in the clip index display area 53. If the user issues an selection command after reversing the state CL1, then it causes the state CL2 in which clip indexes B, C, D, E and F are displayed in the clip display area 53.

In this way, combination of the flexible scene/clip specification function and other functions enables an efficient video editing.

Modifications

Though a scene browsing has been performed on a single scene in the above example, it is apparent to those skilled in the art that it is possible to browse a plurality of specified scenes regardless of whether the scenes are continuous or separated.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for generating an edited video program from at least one source video in a computer-based video editing system, comprising the steps of:

creating at least one record, for at least one source video, containing information on said at least one source video including a number of frames constituting the source video, wherein said at least one records for said at least one source video constitutes a record set;

searching a user-specified one of said at least one source video for start and end frames of each of video segments constituting said user-specified video to add, to said record set, a record of at least one scene which includes a start frame number and an end frame number of each said scene;

displaying, as an index, a free representative of each said at least one scenes in a display area comprising an array of small windows;

permitting a user to select a desired one of said scenes;

permitting said user to group desired ones of said at least one scenes into at least one grouped scene;

in response to said selecting and said grouping, updating predetermined fields of records, which contain an order of said scenes, so that said fields of record reflect an order of current scene indexes;

permitting said user to select desired ones out of said scene indexes to form clip;

permitting said user to put said clip indexes into an order to yield a clip list;

in response to a first command issued by said user while specifying one of the displayed scene indexes, restoring said specified scene index to a relative position with respect to a specified scene index which said specified scene index was adjoining at a time of occurrence of a predetermined event; and in response to a predetermined command from said user, compiling said edited video program on the basis of said clip list.

2. A method as defined in claim 1, wherein said predetermined event is a later one of a last selecting and a last grouping.

3. A method as defined in claim 1, wherein said step of restoring said specified scene index comprises the steps of prompting said user to select whether said specified scene index should be restored to a next-based relative position or a back-based relative position;

in response to a selection of said next-based relative position, moving said specified scene index to just before a scene index with which a value of said predetermined field of a record associated is larger by one than a value of said predetermined field of a record associated with said specified scene index; and in response to a selection of said back-based relative position, moving said specified scene index to just after a scene index with which a value of said predetermined field of a record associated is smaller by one than said value of said predetermined field of said record associated with said specified scene index.

4. A method as defined in claim 3, further comprising the step of, in response to a command to order said clip indexes in order of time, sorting said clips in order of time.

5. A method as defined in claim 4, wherein said step of sorting said clips in order of time includes the step of, if there are clips selected by a drag operation, keeping a current order of said clips selected by a drag operation as it is.

6. A method as defined in claim 1, wherein said step of permitting said user to select desired ones out of said indexes as clip indexes comprises the steps of in response to an unselection command said user issues while specifying said at least one desired clip index in a state of all being clips due to selection by default, changing said specified clip index to at least one scene index; and in response to a selection command said user issues while specifying at least one desired scene indexes, changing said specified at least one scene index to at least one clip index.

7. A method as defined in claim 6, wherein said step of changing said at least one specified clip index to at least one scene index includes the step of changing a normal way of displaying said specified clip index to another way;

and wherein said step of changing said specified scene index to clip index includes the step of restoring said other way to a normal way.

8. A method as defined in claim 6, wherein said step of permitting said user to select desk at least one clip index and/or at least one scene index includes the step of permitting said user to specify said changed specified clip index as said specified scene index be selected.

9. A method as defined in claim 6, wherein said step of permitting said user to select at least one clip index and/or at least one scene index includes the step of permitting said user to specify said changed specified scene index as said specified clip index to be unselected.

10. A method as defined in claim 6, wherein said step of changing said specified at least one clip index to at least one scene index includes the step of updating at least one predetermined fields of said records so that said at least one predetermined fields retains at least one values indicative of an order of selection of respective scenes and clips, wherein said step of changing said specified scene index to a clip index includes the step of updating said predetermined fields of said records so that said predetermined fields retains values indicative of an order of selection of respective scenes and clips, and wherein the method further comprises the step of:

in response to a command to order said clip indexes in a selected order, sorting said clips in said selected order.

11. A method as defined in claim 10, wherein said step of sorting said clips in said selected order includes the step of, if there are clips selected by a drag operation, keeping a current order of said clips selected by a drag operation as it is.

12. A method as defined in claim 1, further comprising the step of permitting said user to specify a desired one of said scene indexes and assigning said specified scene index a predetermined transitional effects, and wherein said step of compiling said edited video program includes the step of applying said assigned transitional effect to said specified scene index.

13. A method as defined in claim 12, wherein said predetermined transitional effects comprise at least one of a dissolve, a fade and a wipe.

14. A method for generating an edited video program from at least one source video in a computer-based video editing system, comprising the steps of:

creating a record comprising at least one scene, for at least one source video, containing information about each said at least one source video including the number of frames that constitute the source video, said records for said at least one source video constituting a record set;

searching a user-specified one of said at least one source video for start and end frames of each of video segments constituting a user-specified video to add, to said record set, a record of each said scene which includes a start frame number and an end frame number of each said scene;

displaying, for each said scenes, a scene index comprising a frame representative of said scene in a display area comprising an array of small windows;

in response to a command to view a user specified scene by a scene index specified by a user, displaying a view window at a predetermined relative position with respect to said user-specified scene index, and displaying, in said view window, a frame of said user-specified scene while changing a position of said frame according to a control by said user;

selecting desired ones of said indexes as clips;

ordering said selected indexes to yield a clip list; and compiling said edited video program on the basis of said clip list.

15. A method as defined in claim 14, wherein said step of displaying a frame comprises the steps of:

displaying a frame of said user-specified scene, identified by a preset initial frame number, in said view window;

in response to an input caused by an operation, by said user, of a switch icon attached to an icon defining a movable range of said switch icon, displays, in said view window, a frame having a number calculated from said movable range, a relative position of said switch icon and a number of frames of said user-specified scene;

in response to a first input caused by an operation, by said user, of a first icon, displaying a frame just preceding said displayed frame in said view window; and in response to a second input caused by an operation, by said user, of a second icon, displaying a frame just following said displayed frame in said view window.

16. A method as defined in claim 15; wherein said step of displaying a frame includes displaying a plurality of frames including said displayed frame.

17. A method as defined in claim 15, further comprising the step of, at a time of creating a record for said user-specified scene, setting said preset initial frame number in a pointer field of said record, and wherein said displaying a frame of said user-specified scene includes the step of obtaining said preset initial frame number from said pointer field of said record of said user-specified scene.

18. A method as defined in claim 17, further comprising the step of, in response to a change of the frame number of said displayed frame, storing a frame number resulting from said change in a field associated with said user-specific scene.

19. A method as defined in claim 14, further comprising the step of, in response to reception of a predetermined input entered during said displaying of a frame, segmenting said user-specified scene whereby making said displayed frame one of two boundaries defining said scene.

20. A method as defined in claim 19, wherein said step of segmenting a frame comprises the steps of:

prompting said user to select whether said frame should be made an end frame of a former segment or a start frame of a later segment;

in response to said selection, adding a suitable frame number to a queue;

if said user desires further segmentation, resuming said displaying of a frame; and if said user desires no more segmentation, performing segmentations of said user-specified scene according to the contents of said queue.

21. A method as defined in claim 20, wherein said step of performing segmentations of said user-specified scene includes the step of automatically naming segments line from said segmentations by appending a delimiter and a sequential notation to an ID of said user-specified scene; and wherein the method flier comprises the step of permitting said user to specify one of said segments resulting from said segmentations as said user-specified scene.

22. A method for generating an edited video program from at least one source video in a computer-based video editing system, comprising the steps of:

creating a record comprising at least one scene, for each of said at least one source video, containing information on each said at least one source video including a number of frames constituting the source video, said records for said at least one source video constituting a record set;

searching a user-specified one of said at least one source video for start and end frames of at least one video segment constituting said user-specified video to add, to said record set, a record of each said scene which includes a start frame number and an end frame number of each said scene;

displaying a scene index comprising a frame representative of each said scenes in a first display area comprising an array of small windows;

displaying as a clip index a frame representative of each of said selected scenes in a second display area comprising an array of small windows;

permitting a user to select a desired one of said scenes or clips;

permitting said user to specify desired ones of said indexes to assemble said desired at least one index in a specified state and remaining indexes in a nonspecified state, said step of permitting said user to specify desired ones including the step of:

further permitting said user to reverse said specified state and said nonspecified state;

in response to said step of permitting said user to specify desired at least one index and a grouping command, grouping indexes in said specified state into a group of clip indexes;

in response to said step of permitting said user to specify desired indexes and a clipping command, changing scene indexes in said specified state to clip indexes;

permitting said user to order said clip indexes to yield a clip list; and in response to a predetermined command from said user, compiling said edited video program on the basis of said clip list.

23. A system for generating an edited video program from at least one source video, comprising:

means for displaying information used in an editing process, said means having a first area comprising an array of windows each of which being adopted to display a scene index comprising a frame representative of each available scenes constituting said at least one source video a second area comprising a smaller array of windows each of which being adapted to display a clip index comprising a frame representative of each scenes;

means for containing records associated with said scenes; comprising a record of each said scene having at last one fields comprising an ID and a number of frames that constitute the scene; and specifying means for permitting a user to specify desired ones of said indexes to make said desired indexes in a specified state and remaining indexes in a nonspecified state, said specifying means including:

means responsive to a predetermined input from said user, for reversing said specified state and said nonspecified state;

means responsive to said specifying means and a grouping command for grouping indexes in said specified state into a group of clip indexes;

means responsive to said specifying means and a clipping command for changing scene indexes in said specified state to clip indexes;

means for permitting said user to order said clip indexes to yield a clip list; and means, responsive to a predetermined command from said user, for compiling said edited video program on the basis of said clip list.

24. A system as defined in claim 23, further comprising means, responsive to a command to view a user specified scene indicated by a scene index specified by a user, for displaying a view window at a predetermined relative position with respective to said user-specified scene index, and means for displaying, in said view window, a fire of said user-specified scene while changing a position of said frame according to a control by said user.

25. A system as defined in claim 24, wherein said means for displaying a frame includes means for displaying a plurality of frames including said displayed frame.

26. A system as defined in claim 24, wherein said means for displaying a frame comprises:

means for displaying a frame of said user-specified scene identified by a preset initial frame number in said view window;

means, responsive to an input caused by an operations by said user, of a switch icon attached to an icon defining a movable range of said switch icon, for displaying, in said view window, a frame having a number calculated from said movable range, a relative position of said switch icon and a number of frames of said user-specified scene;

means, responsive to an input, caused by an operation; by said user, of a first icon, for displaying a frame just preceding said displayed frame in said view window; and means responsive to an input caused by an operation; by said user, of a second icon, for displaying a fame just following said displayed frame in said view window.

27. A system as defined in claim 26, further comprising means, activated at a time of creating a record of said user-specified scene, for setting said preset initial frame number in a pointer field of said record, and wherein said means for displaying a frame of said user-specified scene includes means for obtaining said preset initial frame number from said pointer field of said record of said user-specified scene.

28. A system as defined in claim 27, further comprising means, responsive to a change of the frame number of said displayed frame, for storing a fame number resulting from said change in a field associated with said user-specified scene for resuming a current view.

29. A system as defined in claim 24, further comprising means, responsive to a reception of a predetermined input entered during said displaying a frame, for segmenting said user-specified scene to make said displayed frame one of end or start frames.

30. A system as defined in claim 29, wherein said means for segmenting a frame comprises:

means for prompting said user to select whether said frame should be made an end frame of a former segment or a start frame of a later segment;

means responsive to said selection for adding a suitable frame number to a queue;

means, activated in the event said user desires further segmentation, for resuming said displaying a frame; and means, activated in the event said user desires no more segmentation, for performing segmentations of said user-specified scene according to contents of said queue.

31. A system as defined in claim 30, wherein said means for performing at least one segmentations of said user-specified scene includes means for automatically naming at least one segment resulted from said at least one segmentations by appending a delimiter and a sequential notation to an ID of said user-specified scene; and wherein the system further comprises the step of permitting said user to specify one of said segments resulting from said at least one segmentation as said user-specified scene.

32. A system as defined in claim 23, wherein said means for grouping specified indexes into a at least one grouped clip indexes comprises:

means, responsive to said specifying means and a reception of IDs of user-specified scenes, for adding a record of said grouped scene to a record set comprising records of available video scenes and including said IDs in a field of said added record which is for containing ID of scenes constituting a scene associated with said added record;

means for adding an index indicative of said grouped scene to an index set comprising displayed indexes of available scenes; and means for deleting at least one index of said user-specified scenes from said index set.

33. A system as defined in claim 32, wherein said means for adding an index comprises means for selecting, for said index indicative of said grouped scene, an index of a scene with which said grouped scene begins.

34. A system as defined in claim 32, wherein said means for including said IDs in said field of said added record includes means for keeping the order of said IDs the same as that of indexes of said user specified scenes.

35. A system as defined in claim 32, wherein said means for including said IDs in said field of said added record includes means, further responsive to an indication that an order of a constituent scene of said grouped scene should be in order of selection of said user-specified scenes, for arranging said IDs in an order of selection of said user-specified scenes.

36. A system as defined in claim 35, wherein said means, for arranging an order of said IDs in order of selection of said user-specified scenes, includes the step of, in the event said user-specified scenes includes scenes specified by a drag operation of a mouse, keeping an order of said scenes specified by said drag operation as it is.

37. A system as defined in claim 32, wherein said means for including said IDs in said field of said added record includes means, further responsive to an indication that an order of constituent scenes of said grouped scene should be in order of time sequence of said user-specified scenes, for arranging said IDs in order of time sequence of said user-specified scenes if said user specified scenes have been derived from a single video.

38. A system as defined in claim 32, wherein said means for including said IDs in said field of said added record includes means, further responsive to an indication that an order of constituent scenes of said grouped scene should be in order of time sequence of said user-specified scenes and responsive to a determination that said user-specified scenes include scenes other that scenes derived from a single scene, for arranging only said scenes derived from a single scene in order of time sequence while keeping an order of said other scenes as it is.

39. A system as defined in claim 32, further comprising means for permitting said user to include at least one of said grouped scenes in said user-specified scenes.

40. A system as defined in claim 23, wherein said means for changing at least one specified scene index to at least one clip index comprises:

means, responsive to said specify means and a selection command from said user, for changing said specified scene index to a clip index; and means, responsive to said specifying means and an unselection command from said user, for changing said specified clip index to a scene index.

41. A system as defined in claim 40, wherein said means for changing said specified scene index to a clip index includes means for updating said predetermined fields of said records so that said predetermined fields retain values indicative of an order of selection of respective scenes and clips, wherein said means for changing said specified clip index to a scene index includes means for updating predetermined fields of said records so tat said predetermined fields retain values indicative of an order of selection of respective scenes and clips, and wherein the system further comprises:

means, responsive to a command to order said clip indexes in a selected order, for sorting said clips in said selected order.

42. A system as defined in claim 41, wherein said means for sorting said clips in said selected order includes means, responsive to a determination that there are clips selected by a drag operation, for keeping a current order of said clips selected by a drag operation as it is.

43. A system as defined in claim 23, further comprising means, responsive to a command to arrange said clip indexes in order of time, for sorting said clips in order of time.

44. A system as defied in claim 43, wherein said means for sorting said clips in order of time includes means, responsive to a determination that there are clips selected by a drag operation, for keeping a current order of said clips selected by a drag operation as it is.

45. A system as defined in claim 23, wherein said scenes includes derivative scenes comprising video segments derived from a single source video, and wherein the system further comprises means to attach a user-specified video segment to said single source video comprising means for causing a start time, in said edited video, of a said user-specified one of said video segments to be the same as that in said single source video, and wherein said means for attaching said user-specified video segment to said single source video further comprises:

means, responsive to a command to attach said user-specified videos for setting a flag in a predetermined field of a record associated with said user-specified video; and means for compiling said edited video program on the basis of records for clipped scenes, said means for compiling said edited video program including the step of:

trimming a scene just preceding said user-specified video so that an end frame number of said preceding scene in a program being compiled is smaller by one than a value of a start frame field of said record associated with said user-specified video.

46. A system as defined in claim 23, further comprising means for permitting said user to specify a desired one of said scene indexes and assigning to said specified scene index a predetermined transitional effects, and wherein said means for compiling said edited video program includes the step of applying said assigned transitional effect to said specified scene index.

47. A system as defined in claim 46, wherein said predetermined transitional effects comprise at least one of: a dissolve, a fade and a wipe.

48. A system for generating an edited video program from at least one source video, comprising:

means for displaying information used in an editing process, said means having an area comprising an array of windows with each window displaying a scene index comprising a frame representative of each available scenes constituting said at least one source video, said scenes being adapted to be displayed in said area even if they are selected as clips for use in said edited video program;

means for containing records associated with said scenes, wherein a record of each said scene at least has fields for an ID and a number of frames in the scene;

specifying means for permitting a user to specify desired at least one of said indexes;

means responsive to said specifying means and a segmentation command for segmenting a specified scene or clip;

means responsive to said specifying means and a grouping command for grouping specified indexes into a grouped clip index;

means responsive to said segmenting and said grouping for updating predetermined fields of records which contain an order of said scenes so that said fields of record reflect an order of current scene indexes;

means responsive to said specifying means and a clipping command for changing a specified scene index to a clip index;

means for permitting said user to order a clip indexes to yield a clip list;

means responsive to said specify means and a first command for restoring said specified scene index to a relative position with respect to a scene index which said specified scene index was adjoining at a time of occurrence of a predetermined event; and means, responsive to a predetermined command from said user, for compiling said edited video program on the basis of said clip list.

49. A system as defined in claim 48, wherein said predetermined event is a later one of a last segmenting and a last grouping.

50. A system as defined in claim 48, wherein said means for restoring said specified scene index comprises:

means for prompting said user to select whether said specified scene index should be restored to a next-based relative position or a back-based relative position;

means, responsive to a selection of said next-based relative position, for moving said specified scene index to just before a scene index with which a value of said predetermined field of a record associated is larger by one than a value of said predetermined field of a record associated with said specified scene index; and means, responsive to a selection of said back-based relative position, for moving said specified scene index to just after a scene index with which a value of said predetermined field of a record associated is smaller by one than said value of said predetermined field of said record associated with said specified scene index.

51. A system as defined in claim 48, wherein said means for changing a specified scene index to a clip index comprises:

means, responsive to said specifying means and an unselection command issued in a state of all being clips due to selection by default, for changing said specified clip index to a scene index; and means, responsive to said specifying means and a selection command from said user, for changing said specified scene index to a clip index.

52. A system as defined in claim 51, wherein sad means for changing said specified clip index to a scene index includes means for changing a normal way of displaying said clip index to another way and wherein said means for changing said specified scene index to a clip index includes means for restoring said other way to said normal way.

53. A system as defined in claim 51, wherein said means for changing a specified scene index to a clip index includes means for permitting said user to specify said changed specified clip index as said specified scene index to be selected.

54. A system as defined in claim 51, wherein said means for permitting said user to select a desired index includes the step of permitting said user to specify said changed specified scene index as said specified clip index to be unselected.

* * * * *

UNITED STATES PATENT AND TRADEMARK OFFICE
CERTIFICATE OF CORRECTION

PATENT NO. : 6,710,785 B1
DATED : March 23, 2004
INVENTOR(S) : Kayoko Asai et al.

It is certified that error appears in the above-identified patent and that said Letters Patent is hereby corrected as shown below:

<u>Title page,</u>
Item [57], ABSTRACT,
Line 6, change "d)" to "e)";
Line 7, change "e)" to "f)";
Line 8, change "f)" to "g)"

<u>Column 17,</u>
Line 49, change "records" to -- record --;
Line 57, change "free" to -- frame --
Line 62, change "scenes" to -- scene -- and the line should not be indented;

<u>Column 18,</u>
Line 2, insert -- indexes -- after "clip".
Line 50, change "indexes" to -- index --;
Line 61, delete "desk";
Line 65, after "index" insert -- to --;

<u>Column 19,</u>
Lines 7, 8, 11 and 12, change "fields" to -- field --;
Line 8, change "values" to -- value --;
Line 26, change "effects" to -- effect --;
Line 47, change "scenes" to -- scene --
Line 51, insert -- identifying -- before "by";

<u>Column 20,</u>
Line 1, change "displays" to -- displaying --;
Line 46, change "line" to -- resulting --;
Line 49, change "flier" to -- further --;

UNITED STATES PATENT AND TRADEMARK OFFICE
CERTIFICATE OF CORRECTION

PATENT NO. : 6,710,785 B1
DATED : March 23, 2004
INVENTOR(S) : Kayoko Asai et al.

It is certified that error appears in the above-identified patent and that said Letters Patent is hereby corrected as shown below:

Column 21,
Line 36, after "video" insert -- and --;
Line 39, change "scenes" to -- scene --;
Line 40, delete the semicolon at the end of the line;
Line 42, change "fields" to -- field --;

Signed and Sealed this

Tenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,710,785 B1
DATED : March 23, 2004
INVENTOR(S) : Kayoko Asai et al.

It is certified that error appears in the above-identified patent and that said Letters Patent is hereby corrected as shown below:

Column 21,
Line 67, change "respective" to -- respect --.

Column 22,
Line 1, change "fire" to -- frame --;
Line 12, change "operations" to -- operation --;
Lines 19 and 23, delete the semicolon ";" after "operation";
Line 36, change "fame" to -- frame --;
Lines 59 and 63, change "segmentations" to -- segmentation --.

Column 23,
Line 2, delete "a";
Line 3, change "indexes" to -- index --.

Column 24,
Line 8, change "tat" to -- that --;
Line 22, change "defied" to -- defined --;
Lines 32, delete 2nd occurrence of "a";
Line 38, change "videos" to -- video --;
Line 53, change "effects" to -- effect --;
Line 67, change "scenes" to -- scene --.

Column 25,
Line 25, change "specify" to -- specifying --.

Signed and Sealed this

Third Day of January, 2006

JON W. DUDAS
*Director of the United States Patent and Trademark Office*